(12) United States Patent
Korzelski

(10) Patent No.: US 9,386,892 B2
(45) Date of Patent: Jul. 12, 2016

(54) TOILET SEAT LIFTER AND ROTARY SPRING-LOADED ACTUATOR

(75) Inventor: Zbigniew Korzelski, Tarnow (PL)

(73) Assignee: Zbigniew Korzelski—DELKI, POLPOINT, Cracow (PL)

( * ) Notice: Subject to any disclaimer, the term of this patent is extended or adjusted under 35 U.S.C. 154(b) by 677 days.

(21) Appl. No.: 13/642,998

(22) PCT Filed: Apr. 20, 2011

(86) PCT No.: PCT/PL2011/000039
§ 371 (c)(1),
(2), (4) Date: Dec. 3, 2012

(87) PCT Pub. No.: WO2011/136669
PCT Pub. Date: Nov. 3, 2011

(65) Prior Publication Data
US 2013/0219602 A1    Aug. 29, 2013

(30) Foreign Application Priority Data
Apr. 27, 2010   (PL) .......................................... 391078

(51) Int. Cl.
*A47K 13/10*      (2006.01)
*A47K 13/12*      (2006.01)
*F16H 21/44*      (2006.01)

(52) U.S. Cl.
CPC .................. *A47K 13/10* (2013.01); *A47K 13/12* (2013.01); *F16H 21/44* (2013.01); *Y10T 74/18888* (2015.01)

(58) Field of Classification Search
CPC ................................ A47K 13/10; A47K 13/12
See application file for complete search history.

(56) References Cited

U.S. PATENT DOCUMENTS

| | | | |
|---|---|---|---|
| 5,946,740 A | 9/1999 | Sorimachi | |
| 6,052,869 A | 4/2000 | Suzuki | |
| 2010/0270113 A1* | 10/2010 | Ogawa | .......................... 188/281 |

FOREIGN PATENT DOCUMENTS

| | | |
|---|---|---|
| DE | 100 20 180 A1 | 10/2001 |
| EP | 0 422 882 A1 | 4/1991 |
| WO | 01/12049 A1 | 2/2001 |

* cited by examiner

*Primary Examiner* — Janie Loeppke
(74) *Attorney, Agent, or Firm* — Ziegler IP Law Group, LLC

(57) ABSTRACT

A toilet seat lifter is mounted together with a toilet seat on a toilet bowl. The design of the lifter enables the lifting and lowering of a toilet cover and/or toilet seat by means of a lifter controlling device or in the traditional manner. During the lifting of the toilet seat, the gear of the device assists the lifting of its components while, in the case of lowering them, the gear prevents their inert from falling. The design of the lifter enables the positioning of the toilet seat in a lifted position, preventing their resting against the wall or toilet cistern. In case of improper use, consisting in the lifting of the toilet seat components by means of a controlling device and simultaneously lowering them in the traditional manner (or inversely), the disconnection of the gear will result, precluding its damage.

11 Claims, 31 Drawing Sheets

1

2

3

TOILET SEAT LIFTER AND ROTARY SPRING-LOADED ACTUATOR

BACKGROUND

1. Field

The aspects of the disclosed embodiments relate to a toilet seat lifter with a rotary spring-loaded actuator. The rotary spring-loaded actuator mounted in the toilet seat lifter represents essential gear of the cover and toilet seat lifting equipment. The lifting and lowering of the toilet seat with the lifter is performed without the direct contact of toilet user's hand with the cover or seat of the toilet. The toilet seat lifter is mounted together with the toilet seat on the toilet bowl.

Particular areas of the invention's utilisation are generally available public conveniences: in office buildings, hotels, schools, hospitals, working places, etc.; toilets in public transport: railways, air and sea transport, as well as household toilets.

2. Brief Description of Related Developments

Known lifters of toilet seat are composed of a motor, which the rotary motion, through the mechanical structures of gear transmissions and catch pawls, is used for lifting the seat and cover of the toilet seat. There are also known lifters constructed as compound rotary pulley systems, over which cables are slid, separately engaged with the toilet seat, and separately to the cover of the toilet seat and toilet bowl opening. External cables render the use of the toilet bowl difficult for its user. Furthermore, they are frequently damaged in public conveniences by their users.

The automatic device that opens/closes a toilet seat and cover is known from the international invention application no. PCT/KR2009/003409. The device is mounted between the water tank and rear part of toilet seat that is bent up and matched to the device. The device is equipped with two spring-hydraulic actuators. The spring loaded part of the actuator drives the reciprocating motion of the hydraulic actuator piston rod. The compressed medium of the hydraulic actuator operates the arm of the toilet seat or toilet seat cover lifting. The tightening and relieving of tension of the spring-loaded actuator spring is performed by a system of shafts, through which a cable permanently fastened on one end of the spring gear is routed. The disadvantage of this device is the necessity of fastening an additional tray for the mounting of the device, as well as the necessity of using a toilet seat of special design and adequately bent up rear parts of the seat and cover.

The seat of the toilet seat mounted on a toilet bowl is known from the American invention application no. US2008/0189843. This seat is lifted by means of an externally mounted lever system, operating the seat hinge. The system of levers is put in motion with the user's foot through an external pedal, operating the system of levers lifting the toilet seat. An external pedal is mounted next to one side of a toilet bowl. The disadvantage of this invention is the high risk of damaging the toilet seat lifting gear by malicious users, as well as the possibility of lifting only and exclusively the toilet seat.

Various types of spring-loaded actuators are known, finding their utilisation especially for assisted operating of hydraulic actuator piston rods. The spring-loaded actuator used in sweeping machine cab tipping gear is known from Polish patent application no. 131057. This actuator, composed of a body, piston rod, and spring, is placed between two sliding spring disks, whereas the actuator piston rod is equipped with an internal driver of the lower spring disk and with an external driver of the upper spring disk. Additional limiters of the upper and lower disk external positions are mounted in the actuator body. The upper disk of the spring is slide seated on the piston rod, while the lower disk of spring is slide seated in the body.

An actuator with a return spring, equipped with a mandrel attached to the actuator bottom and simultaneously located inside the piston rod of a hollow piston, is known from the Polish patent application no. 160550. A compression spring, which is abutted with its one end against the outer collar on the end of mandrel, while against the ring set on the axial inlet opening of piston rod, is set on the mandrel.

A single-acting, pulling actuator is known from the Polish patent application no. 160624. This actuator has two compression return springs, seated on a piston rod outside the actuator. The spring guide is slide seated on the actuator piston rod. The spring guide has the form of a thin-walled sleeve, equipped on one end with an external collar, while with internal collar on the opposite end, slide seated on the piston rod.

All of these known actuators can operate only in the direction of the rectilinear piston rod movement.

Various hydraulic actuators are known, in which rectilinear piston rod movement is converted into rotational movement by means of complex mechanical equipment. A hydraulic actuator with rotational motion is known from the Polish patent application no. 195117. This actuator, comprising a body, several covers, and shaft, create a working chamber, divided with partitions into compartments. The side surfaces of such created compartments constitute pressure plates, adjoining flexible rings. Flexible rings are seated between the pressure plates and internal surfaces of covers. The working medium of the actuator is fed to the compartment under high pressure, fills it, and subsequently pressing on the movable partition rotates the shaft in the adequate direction by means of guides.

Obtaining of rotary motion in all known solutions of actuators operating in reciprocating mode is either impossible, or accomplished by means of very complex and costly, additional hydraulic-mechanical equipment.

SUMMARY

The toilet seat lifter in accordance with aspects of the disclosed embodiments constitutes a mechanical structure, composed of a toilet seat cover and seat lifting and lowering gear, control gear, and a control device.

The toilet user employing the toilet seat lifter controls the set position of the toilet seat cover and seat by launching the adequate functions of the control device. The control device launches the control gear, controlling its operation. The operation of control gear is assisted by lifting and lowering gear, comprised of two rotary spring-loaded actuators.

The toilet seat lifter is built of structural pipe, seated in the openings of two mounting lugs of the lifter. The lifter gears mating to each other are mounted on the structural pipe, as well as on connecting members located inside the structural pipe. The structural pipe also constitutes the rotation axis of two seat hinges and two hinges of the toilet seat cover. Two rotary modules, two reciprocating modules, and two springs of adequately selected thrust force are mounted on the structural pipe. Mounted modules and springs create two rotary spring-loaded actuators—the left one for assisted lifting and lowering of the toilet seat, and the right one for assisted lifting and lowering of the toilet seat cover. Control gear for the toilet cover and position is also mounted on the structural pipe.

Mounting lugs—left and right, are load carrying components of the actuator. Each of the mounting lugs has a foot, to which holders—the left and right one—are adequately mounted. Each holder of the left mounting lug has an opening of the same diameter for the seating of the structural pipe in it. Each of the left mounting lug holders is mounted on the structural pipe. Adequate hinges of the toilet seat cover and seat adjoin the outer sides of each mounting lug holder.

The right and left hinge of the cover, as well as the right and left hinge of the seat connect the toilet seat lifter to the toilet cover and seat.

The structural pipe of the lifter has several mounting openings and cut-outs of various shapes. The mating modules—the left reciprocating one and the left rotary one are mounted on the structural pipe on the left side of the lifter. The left reciprocating module to the left lifter spring connecting member is located inside the structural pipe from its left side. This connecting member is coupled to the left reciprocating module by means of a mounting peg. This peg passes through an adequately shaped cut-out in the structural pipe, enabling its free reciprocating motion. The internal connecting member is coupled on the other side to the sleeve of the lifter left spring through a peg passing by the adequately shaped cut-out in the structural pipe.

The body of the left reciprocating module has the guide of thrust mandrel on the left side. The thrust mandrel fastened to the structural pipe is seated inside this guide. The thrust mandrel of the left reciprocating module enables the left reciprocating module to do only sliding motion along the structural pipe axis. This mandrel protects the reciprocating module against making the rotary motion around the structural pipe.

In one embodiment, not less than one antifriction bearing with adequately selected rolling components is seated on the thrust mandrel. Favourably this bearing is the needle bearing. The purpose of the bearings is to reduce to a minimum the friction resistance existing between the mandrel and walls of the reciprocating module thrust mandrel guide.

The left reciprocating module touches the left rotary module of the lifter through a shaped contact surface. The contact surfaces of these modules constitute "attack surfaces". The shape of the left reciprocating module attack surface is shaped in relation to the attack surface of the left rotary module.

Favourably, adequately selected antifriction bearing is seated between the contact surfaces of the left reciprocating module and left rotary module.

Favourably, the shape of the left reciprocating module contact surface constitutes sector or sectors from the shaped attack surface.

Favourably, the sector or sectors constitute the suitably shaped integral key or keys of the left reciprocating module, on which yoke or yokes serving as the seating of bearing ball or balls are located. This structure significantly reduces the friction resistance existing within the contact of the modules during the operation of the lifter.

The left rotary module is rotary seated on the structural pipe. The left rotary module has a shaped "attack surface" on its left side, which constitutes a contact surface with the reciprocating module. The shape of the left rotary module attack surface is shaped in relation to the attack surface of the left reciprocating module.

Favourably, the shape of the left rotary module contact surface constitutes sector or sectors from a shaped attack surface.

Favourably, a yoke or yokes serving as the seating of the bearing ball or balls is located on adequately shaped integral key or keys of the left rotary module, in the contact point with the left reciprocating module. This structure significantly reduces the friction resistance existing within the contact of the modules during the operation of the lifter.

The left rotary module is ended with a collar at its right side, with protruding to the outside ring for seating the left hinge of the toilet seat. The left rotary module, combined with the left hinge of the seat is rotary seated on the structural pipe. The left hinge of the seat is located in the vicinity of the lifter left mounting lug left holder outer side. The left hinge of the seat is coupled with the right hinge of the seat through the toilet seat.

Joining of the hinges with the seat of toilet seat is accomplished by means of mounting screws or in another arbitrary manner.

Favourably, the hinges of the seat are equipped with mounting feathers in order to stiffen the connection of the hinges with the toilet seat. Mounting feathers of the seat hinges are mounted in adequately shaped keys, produced to this end in the toilet seat.

Favourably, the rotary arm of the seat hinge has openings for the placing of bearing balls in them. Such a solution minimises the friction resistance existing between the left hinge of the seat and the left holder of the left mounting lug.

Spacer sleeve adjoins the lifter left mounting lug right holder outer side. The spacer sleeve is composed of two rings of different diameters and is seated on the structural pipe. The left hinge of the cover is rotary seated on the left ring of the spacer sleeve. The right ring of the spacer sleeve, having a diameter larger than that of the left ring, protects the left hinge of the cover against the influence of the left compression spring, supported directly against the right side of the spacer sleeve right ring. In such a solution, the left compression spring is supported against the right holder of the left mounting lug through the spacer sleeve. The left spring of the lifter installed on the structural pipe is coupled with the left spring sleeve on its opposite side, and exerts pressure on this sleeve. This pressure is transferred onto the left reciprocating module of the lifter by the sleeve coupled with a peg to the connecting member seated inside the structural pipe.

The left compression spring pulls the left reciprocating module by means of an internal connecting member. The left reciprocating module exerts pressure on the attack surface of the left rotary module with its attack surface. This pressure assists the rotational motion of the left rotary module around the structural pipe. The left reciprocating module, left rotary module, and left compression spring together with an internal connecting member constitute the left rotary spring-loaded actuator of the toilet seat lifting and lowering gear.

The left hinge of the cover is coupled with the right hinge of the cover through the cover of the toilet seat.

Joining of the hinges with the cover of the toilet seat is accomplished by means of mounting screws or in another arbitrary manner.

Favourably, the hinges of the cover are equipped with mounting feathers in order to stiffen the connection of hinges with the cover of the toilet seat. Mounting feathers of the cover hinges are mounted into adequately shaped keys, produced to this end in the cover of the toilet seat.

In the central part of the structural pipe, between the mounting lugs, the thrust sleeve of the lifter right spring is seated and fastened to the structural pipe. The thrust sleeve of the right spring is fastened to the structural pipe by means of a mounting peg. One end of the compression spring is permanently fastened to the right side of the thrust sleeve. This fastening prevents the right compression spring rotation around the structural pipe. The opposite end of the right compression spring is permanently fastened to the left outer wall of the lifter right reciprocating module. The permanent fastening of the right compression spring to the thrust sleeve and to the right reciprocating module protects the right reciprocating module against rotation against the structural pipe. If the torsional rigidity of the spring will enable the right reciprocating module rotational motion to such an extent that it would negatively influence the operation of the system, the body of the right reciprocating module should be equipped with a guide for the thrust mandrel. The thrust mandrel fastened to the structural pipe is seated inside this guide. The thrust mandrel precludes the rotational motion of the right reciprocating module.

The right reciprocating module touches the right rotary module of the lifter through a shaped contact surface. The contact surfaces of these modules constitute "attack surfaces". The shape of the right reciprocating module attack surface is shaped in relation to the attack surface of the right rotary module.

Favourably, an adequately selected antifriction bearing is seated between the contact surfaces of the right reciprocating module and the right rotary module.

Favourably, the shape of the right reciprocating module contact surface constitutes sector or sectors from a shaped attack surface.

Favourably, the sector or sectors constitute suitably shaped integral key or keys of the right reciprocating module, on which yoke or yokes serving as the seating of the bearing ball or balls are located. This structure significantly reduces the friction resistance existing within the contact of the modules during the operation of the lifter.

The right rotary module is rotary seated on the structural pipe. The right rotary module has a shaped "attack surface" on its left side, which constitutes a contact surface with a reciprocating module. The shape of the right rotary module attack surface is shaped in relation to the attack surface of the right reciprocating module.

Favourably, the shape of the right rotary module constitutes sector or sectors from a shaped attack surface, which is/are the contact surface with the right reciprocating module.

Favourably, a yoke or yokes serving as the seating of the bearing ball (or balls) is (are) located on an adequately shaped integral key or keys of the right rotary module, in the contact point with the right reciprocating module. This structure significantly reduces the friction resistance existing within the contact of the modules during the operation of the lifter.

The right compression spring exerts pressure on the right reciprocating module. This pressure assists the rotary motion of the right reciprocating module around the structural pipe through the shaped contact surface of these modules. The right rotary module, right reciprocating module, and right compression spring constitute the right rotary spring-loaded actuator of the toilet seat cover lifting and lowering gear.

The right rotary module is ended with a collar at its right side, with protruding to the outside ring for seating right the hinge of the cover. The right rotary module, combined with the right hinge of the cover is rotary seated on the structural pipe. The right hinge of the cover is located in the vicinity of the lifter's right mounting lug left holder outer side.

Favourably, the rotary arm of the cover right hinge had openings for the placing of bearing balls. Such a solution minimises the friction resistance existing between the right hinge of the cover and the left holder of the right mounting lug.

The left holder of the right mounting lug is coupled with the structural pipe through the central mounting opening.

The control gear of the toilet seat lifter is mounted from the right side of the toilet seat lifter. The control gear is composed of a rotary wheel, rotary sleeve of the control gear, the latches controlling sleeve, adequately shaped latches, two rotary control rings, the control rings disconnecting sleeve, compression spring, thrust ring of the spring, as well as two connecting members seated inside the structural pipe. The control gear is actuated by the lifter operation control device. Selection of an adequate control device function results in the displacing of cable or strand with simultaneous rotation of a control gear rotary wheel. The rotary wheel of the control gear, while making a rotary motion in the adequate direction, transfers the selected operating function to the lifter control gear components. The rotary wheel is seated between the holders of the right mounting lug and is fastened to the rotary sleeve seated on the structural pipe.

The right mounting lug has two holders—the left one and the right one. The left holder of the right mounting lug has an opening for the seating of the structural pipe in it. The right holder of the right mounting lug has a central opening of diameter enabling the free rotation of the rotary sleeve seated on the structural pipe. There are two, adequately shaped openings on the right holder of the right mounting lug of the lifter, serving as the seating of control gear latch components tips.

The rotary sleeve of the control gear, rotary seated on the structural pipe, is coupled to the rotary wheel from the left side, while the left rotary control ring constitutes its right termination. In the vicinity of the right mounting lug, the right hinge of the toilet seat is mounted on the control gear rotary sleeve.

The latch components of the control gear are mounted from the right side of the seat right hinge arm.

The arm of the toilet seat right hinge features two adequately shaped openings for the seating of latch components tips. When the seat rests on a toilet bowl, the openings for the seating of latch component tips on the right hinge of the seat, as well as the openings for the seating of the right mounting lug latch component tips are matching to each other at least in their part, thus creating a gap enabling the seating tips of latch components mounted to the right hinge of the toilet seat.

In the vicinity of the right side of the right seat hinge, the latches control sleeve is mounted on the rotary sleeve of the control gear. The latch components of the control gear are mounted on the body of the latch control sleeve. The latch components mounted on the sleeve interact with the latch components mounted to the right side of the right seat hinge.

In case when the toilet seat rests on a toilet bowl, the tips of latches mounted to the right side of the right seat hinge pass through the openings located on the circumference of the right seat hinge and are mounted in the openings on the circumference of the right mounting lug right holder. Lifting of the seat by means of a control device will cause the engaging of the latches resulting from the rotation of the control sleeve. Continued rotary motion of the latches control sleeve transfers the rotary sleeve rotary motion through engaged latches onto the right seat hinge, which results in the lifting of the toilet seat. During the lifting of the toilet seat, the tips of latches slide out from the right mounting lug right holder openings and slide over the mounting lug right holder right surface circumference and, therefore, the latch components mounted to the right seat hinge change its position in relation to the latch components mounted on the surface of the latches control sleeve. During the lifting or lowering of the toilet seat by means of a control device, the latch components of the control sleeve and the latches mounted on the right seat hinge mutually influence each other.

Favourably, the latch components of the toilet seat control are made of elastic material.

If the toilet seat is lifted manually, the latch mounted on the hinge surface will pass-by the latch mounted on the latches control sleeve, thus enabling the manual lifting of the seat.

On the right side of latches control sleeve, there is the left rotary ring controlling the lifting and lowering of the toilet seat cover, mounted on the control gear rotary sleeve. Two adequately shaped cut-outs are seated in the left rotary control ring from its right side on the outer surface. These cut-outs are seated on different levels, on the opposite sides of its diameter. In the right outer wall of the left rotary control ring, there is also located a bearing ball seating yoke.

Favourably, the control gear rotary sleeve, latches control sleeve, and left rotary control ring constitute a single structural component.

The sleeve that disconnects the rings controlling motion of the toilet seat cover, is slide mounted on the right side of the left rotary control ring, on the structural pipe. The disconnecting sleeve is terminated on the left side with adequately formed collar. The left side of this collar features an adequately shaped recess on the part of its surface, with leaps inclined from two sides of this recess. This recess constitutes a part of the bearing ball travel path, seated on the right outer wall of the left rotary ring that controls the lifting and lowering of the toilet seat cover.

The sleeve disconnecting the control rings has in its central part adequately shaped cut-outs that enable the travelling of the peg that fastens the right rotary ring, controlling the lifting and lowering of the toilet seat cover, to a movable connecting member seated inside the structural pipe. These cut-outs enable the reciprocating and rotary motions of the right rotary control ring. These motions are executed by the right control ring together with internal right connecting member, placed inside the structural pipe. The right part of the left internal connecting member is slide seated in opening of the right internal connecting member. The sleeve disconnecting the control rings features a guide of the thrust mandrel on its right side. The thrust mandrel, fastened to the structural pipe, protects the disconnecting sleeve against the rotary motion around the structural pipe.

The right rotary ring controlling the lifting and lowering of the toilet seat cover is seated on the disconnecting sleeve. This ring is coupled with the right connecting member, seated inside the structural pipe.

The right rotary control ring has an opening of an adequate depth on its left outer surface, in which the collar of the sleeve disconnecting the rotary rings of the cover motion control is seated. From the left side of the right control ring, and above the opening of disconnecting sleeve collar seating, there are mounted two adequately shaped teeth, protruding towards the left rotary control ring. The teeth are shaped so that each of them can freely slide into adequately shaped cut-outs on the left rotary control ring in the moment, when the bearing ball of the left control ring is inserted into a suitably formed recess on the left side of the disconnecting sleeve collar. These teeth are arranged on the seating level of adequately shaped cut-outs, made in the left rotary control ring on different levels on the opposite sides of its diameter.

Compression spring of the control gear adheres to the right wall of the right rotary control ring. The compression spring of the control gear abuts the right side against the thrust ring mounted on the structural pipe. The compression spring of the control gear exerts pressure on the right rotary ring controlling the toilet seat cover.

Two connecting members of arbitrary cross-section, the left one and the right one, are seated on the right side of the toilet seat lifter, inside the structural pipe. These connecting members are slide coupled in relation to each other.

Favourably, these connecting members have an arbitrary polygon-shaped cross-section.

The right part of the left connecting member has a cross-sectional area of such size so that it could be inserted into the internal opening of the right connecting member.

The right connecting member has an oblong hollow opening from its left side, which enables the placement of the left connecting member right part in its interior. The left and right connecting members are coupled to each other in a manner enabling the reciprocating motion of the right connecting member hollow part along the right part of the left connecting member. The left connecting member is coupled by means of a peg with the right rotary module of cover lifting and lowering.

The right connecting member is coupled by means of a peg with the right rotary ring controlling lifting and lowering of the toilet seat cover. The left connecting member solely performs the rotary motion. The right connecting member performs rotary and reciprocating motions.

The bases of the mounting lugs, as well as mounting bolts, have a lengthwise opening on the whole length, through which the control device cable or strand can be routed.

The control device serves for the setting of the cover position, as well as the setting of the toilet seat position. The control device is mounted in the arbitrary place of the toilet, favourably on the wall to which a toilet bowl back adheres.

The control device is coupled with the lifter control gear by means of a cable or strand routed through an opening in a mounting bolt.

Selection of the toilet seat position setting is done by means of the control device. The cover and seat of the toilet seat can be set in three basic positions, linked closely with the setting of adequate elements of the control device mounted in the toilet seat lifter:

position 1—the setting, in which the cover and the seat rest on a toilet bowl;

position 2—the setting, in which the cover is lifted, and the seat rests on a toilet bowl;

position 3—the setting, in which both the cover and the seat are lifted;

The control device has an arbitrary design of cable or strand actuation, which sets in an adequate position the rotary wheel of the gear controlling cover or seat of the toilet seat. On the section between the control device and the bolt fastening the mounting lug to a toilet bowl, the cable or strand travels inside a shell.

Favourably, the cable or strand shell had a flexible design mounted between the control device and the lifter control gear. Such a shell determines the path of the cable or strand travel on the section between the control device and the lifter control gear.

Construction of the control device may be of different types depending on individual user demands. The design of the control device, depending on the requirements, may be the mechanical, electrical, or electronic type. The control device may feature known electronic systems of cable or strand travel launching, actuated with touch- or touchless switches.

Favourably, the control switches of the control device are mounted in a single housing together with the toilet bowl flushing push-button.

In case when the control device is of electrical or electronic design, an electric motor may be mounted in place of the control gear rotary wheel. In such case, a power cable and/or control cable should be routed through the opening of the right mounting bolt, instead of the cable or strand.

The rotary spring-loaded actuator, in accordance with aspects of the disclosed embodiments, is one of the essential structural elements of the toilet seat lifter. The rotary spring-loaded actuator transfers the spring action force by means of modules, to elements that require such influence. The reciprocating and rotary modules mutually influence each other. The rotary module position change results in a relative shift of the reciprocating module, which causes the tensioning or releasing of the spring. Next, in the result of spring force action onto the reciprocating module, the reciprocating module forces a position change of the rotary module. The basic elements of the spring-loaded actuator are: rotary module, reciprocating module, not less than one compression spring or not less than one tension spring, as well as not less than one structural component. The rotary module and/or reciprocating module is permanently or in a separable manner coupled with a component that requires actuator action.

The structural component feature cross-section is of an arbitrary shape. This cross-section enables the rotary module to execute rotary motion, while the reciprocating module is to execute reciprocating motion.

Favourably, the spring of suitably selected parameters is slid over the structural component, or is seated inside the structural component and is mounted between the support or fastening point and reciprocating module. Compression of the tension spring acts on the reciprocating module.

The structure and shape of reciprocating module and rotary module are individually selected to each type of spring-loaded actuator application.

The reciprocating module is permanently or in a separable manner coupled with a component that requires actuator action. The reciprocating module built of a body that, from one of its sides, is terminated with a shaped "attack surface", simultaneously constituting a contact surface with a rotary module. The reciprocating module is slide seated on a structural component or inside this component.

Favourably, the reciprocating module features not less than one antifriction bearing for the reduction of friction resistance, mounted in a place of seating in relation to a structural component and/or supporting or wedging component.

Favourably, a guide for the thrust mandrel is seated in a body of the reciprocating module. The thrust mandrel fastened to the structural component is seated inside this guide. The thrust mandrel of the reciprocating module enables the reciprocating module to only perform a sliding motion along the structural component axis. This mandrel protects the reciprocating module against making the rotary motion around the structural component.

Favourably not less than one antifriction bearing with adequately selected rolling components is seated on the thrust mandrel. The purpose of the bearing or bearings is to reduce to a minimum the friction resistance existing between the mandrel and the walls of the reciprocating module thrust mandrel guide.

Reciprocating module contacts the rotary module of the actuator. Contact surfaces of these modules constitute "attack surfaces". Shape of the individual module "attack surfaces" depends on the desired range of module operation and characteristics of the operation. Attack surface of reciprocating module is shaped in relation to the attack surface of the rotary module.

Favourably not less than one antifriction bearing is seated between the shaped contact surface of reciprocating module and shaped contact surface of rotary module.

Favourably, the shape of the reciprocating module contact surface constitutes sector or sectors from shaped attack surface.

Favourably, the sector or sectors constitute a suitably shaped integral key or keys of reciprocating module, on which yoke or yokes serving as the seating of the bearing ball or balls are located. Then, the reciprocating module acts on the rotary module or the rotary module acts on the reciprocating module by way of bearing ball or balls. This structure significantly reduces the friction resistance existing within the contact of the modules during the operation of the rotary spring-loaded actuator.

The rotary module is permanently or in a separable manner coupled with a component that requires actuator action. The rotary module, composed of a body, is rotary seated on or inside the structural component. Favourably not less than one antifriction bearing is mounted between the rotary module and structural component or rotary module and wedging and/or supporting point, serving as the reduction of friction resistance.

The body of the rotary module is terminated on one of its ends with a shaped "attack surface", being simultaneously a contact surface with the reciprocating module. Shape of the "attack surface" depends on the desired range of module operation and the characteristics of the operation. Attack surface of the rotary module is shaped in relation to the attack surface of the reciprocating module.

Favourably not less than one antifriction bearing is seated between the shaped contact surface of the rotary module with a shaped contact surface of the reciprocating module.

Favourably, the shape of the rotary module contact surface constitutes sector or sectors from shaped attack surface.

Favourably, the sector or sectors constitute suitably shaped integral key or keys of rotary module, on which yoke or yokes serving as the seating of bearing ball or balls are located. Then, the rotary module acts on the reciprocating module or the reciprocating module acts on the rotary module by way of bearing ball or balls. This structure significantly reduces the friction resistance existing within the contact of the modules during the operation of rotary spring-loaded actuator.

Selection of compression or tension spring parameters directly influences the acting force of rotary spring-loaded actuator.

It is in favour that during the initial stage of rotary spring-loaded actuator operation, the installed spring had an adequately matched state of tension.

Favourably more than one spring of an adequately matched thrust force are mounted in single rotary actuator.

Rotary spring-loaded actuator according to in accordance with aspects of the disclosed embodiments has broad utilisation in the lifting and lowering of various component types and/or in acting on various type components that require such actions.

Two or more actuators are mounted on a single structural component depending on the requirements.

The advantage of the toilet seat lifter, as invented, is its wide utilisation in toilets. The lifter may be installed in already existing toilets, as well as in newly installed toilets. Construction of the equipment enables the lifting and lowering of the toilet seat by means of a control device, as well as in a traditional way—manually. Structure of the lifter does not preclude the lifting of cover and/or toilet seat by means of a control device and manual lowering, and inversely. Design of the lifter sets the cover of toilet seat in the lifted position, preventing resting them against the wall or toilet cistern. Structure of the lifter protects the components of the toilet seat against damage that in effect of its improper use consisting in pushing the toilet seat components outside the positioning range. Structure of the lifter protects the gear against improper utilisation consisting in the simultaneous lifting of the cover and/or seat by means of a lifter control device and simultaneous lowering them manually, or inversely. In case of such action the disconnection of the lifter gears will occur. Disconnected gears of the lifter will engage automatically after the seat and cover are put down on the toilet bowl and after the control device is set in position 1, which is the home position of the toilet seat lifter operation. Such a solution enables its utilisation in public conveniences, which are most seriously endangered with the unpredictable actions of users. The control device as well as lifter housing together with hinges may represent an aesthetical element of the toilet equipment. Rotary spring-loaded actuators of the cover and seat installed in the toilet seat lifter have such selected parameters so that both the cover and the seat would be in a balanced inertia state on the individual lifting stages. Such a state enables the lifting of the cover and toilet seat on each stage with the utilisation of similar force. The toilet seat lifter prevents the free falling of the cover and seat onto the toilet bowl.

The advantage of a rotary spring-loaded actuator as invented is its simple construction, operational reliability, and versatility of utilisation especially in applications in which other type actuators have low effectiveness or are impossible to use. The rotary spring-loaded actuator features significant constructional possibilities of using modules interaction relationship on state of spring tension or spring pressure force influence on the operation of the modules. It is possible to combine the actuators in series or in groups. The rotary spring-loaded actuator finds wide application in interaction with other equipment, in which it may be used as a subassembly or constitute itself as the main structural component.

BRIEF DESCRIPTION OF THE DRAWINGS

The aspects of the disclosed embodiments are further described in reference to the accompanying drawings, in which.

DETAILED DESCRIPTION OF THE DISCLOSED EMBODIMENTS

Figure 1:
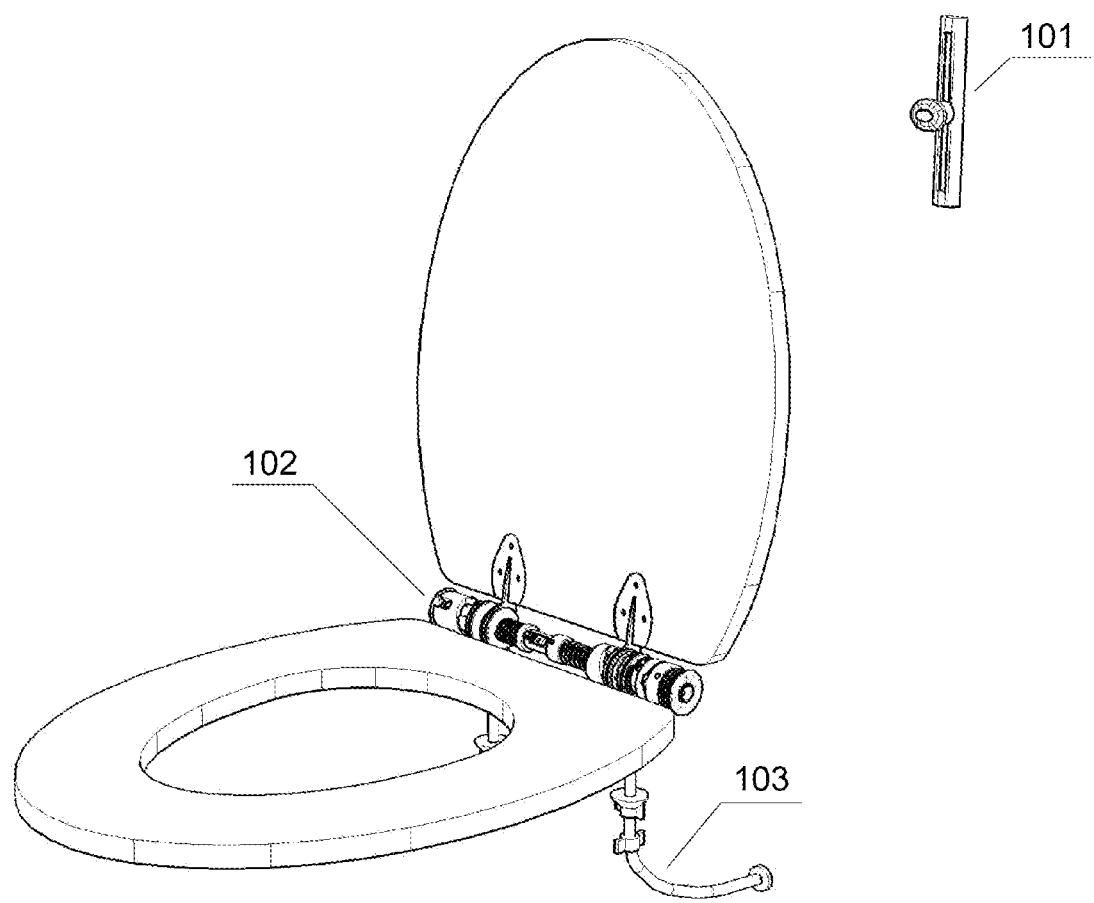
FIG. 1 shows the lifter with a mounted toilet seat and an example of a control device.
Figure 2:
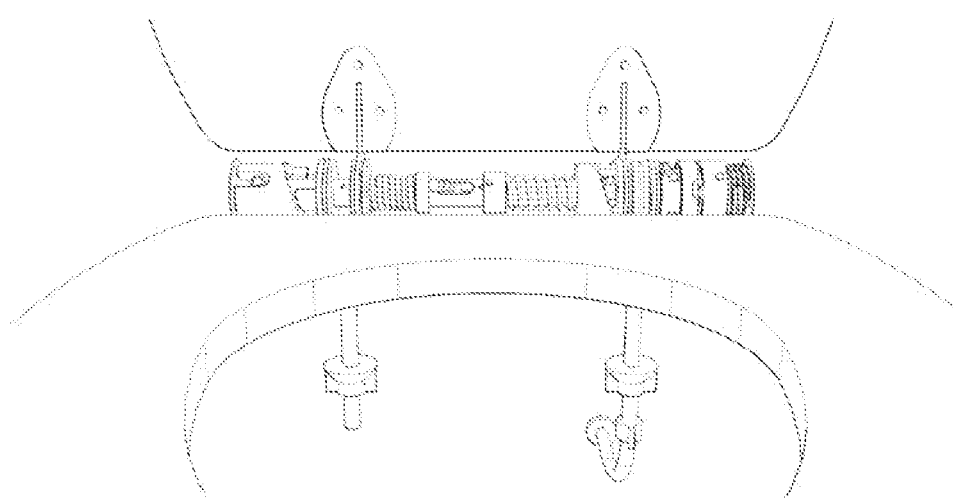
FIG. 2 shows the lifter of the toilet seat without a housing together with the toilet seat and cover mounted.
Figure 3:
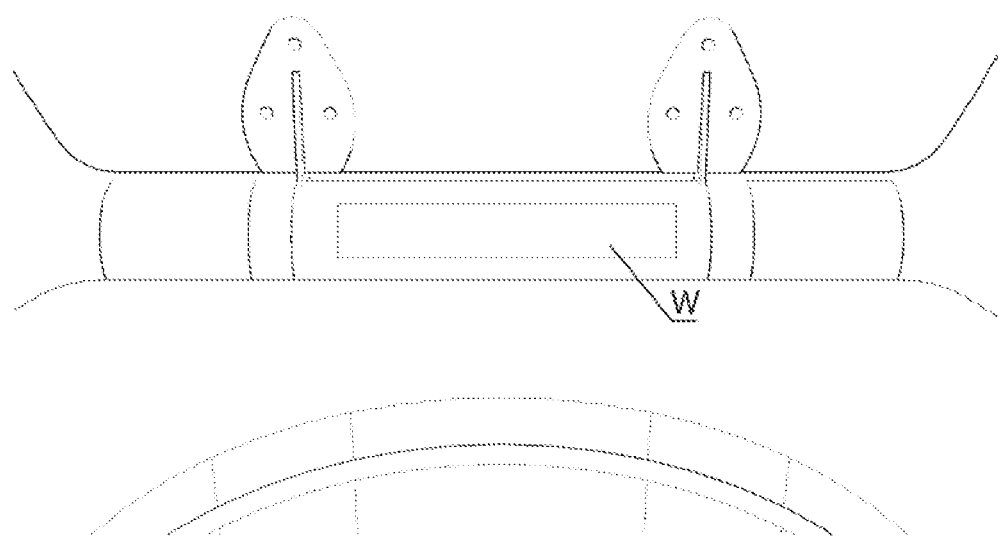
FIG. 3 presents the toilet seat lifter in an external housing.
Figure 4:
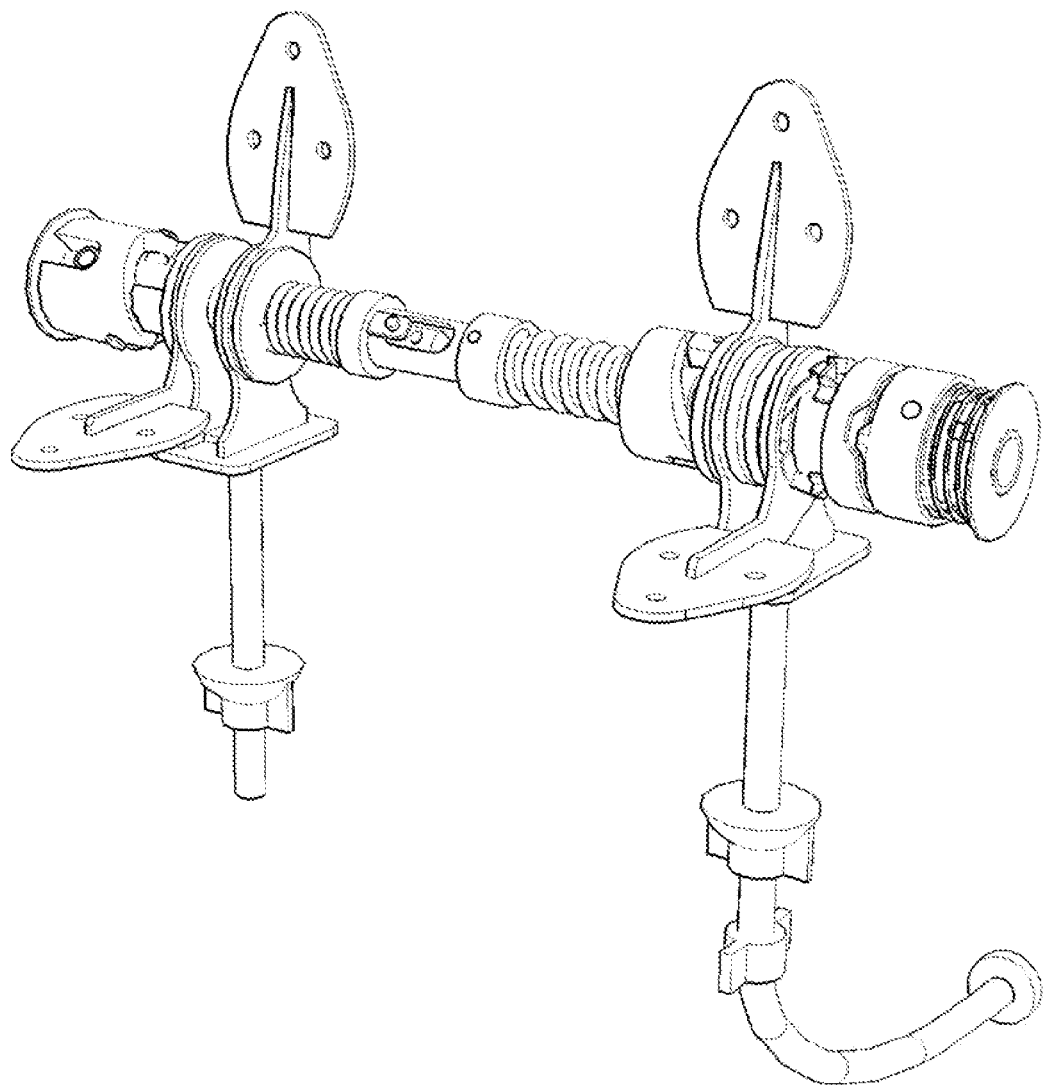
FIG. 4 presents the lifter without an external housing.
Figure 5:
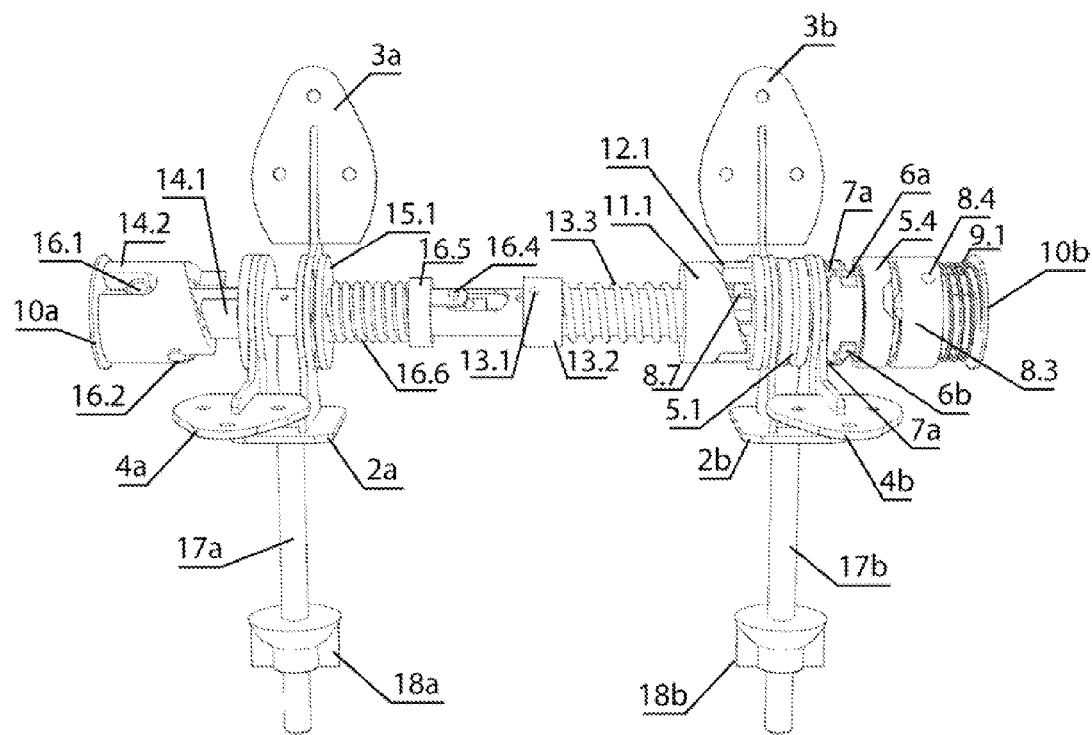
FIG. 5 presents the lifter structure.
Figure 6:
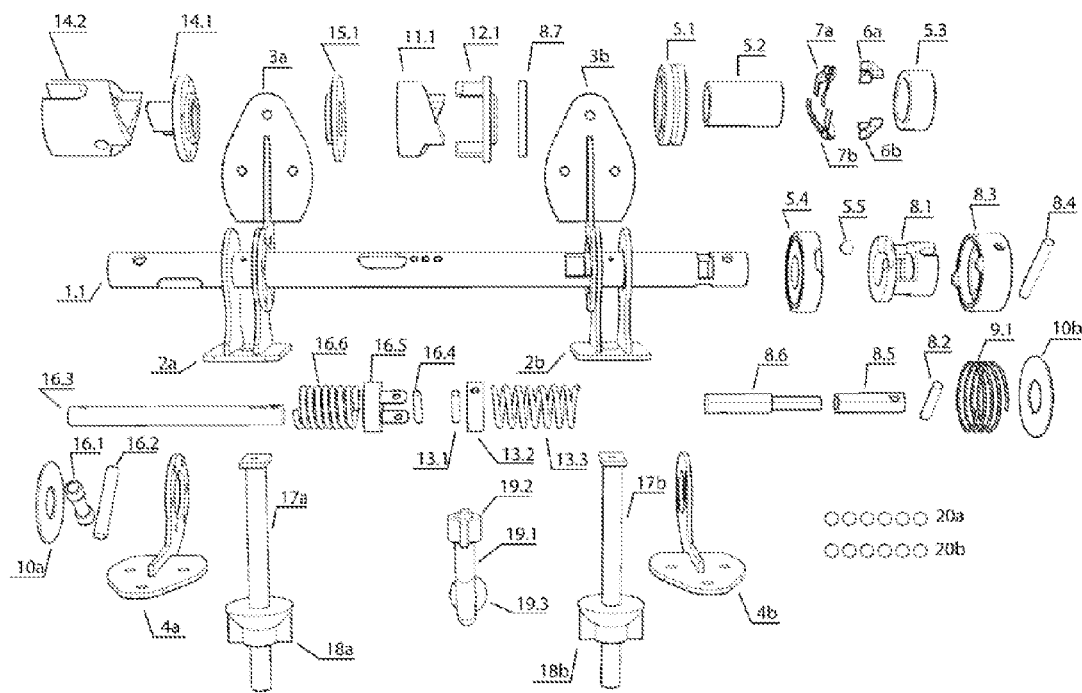
FIG. 6 presents a list of the lifter components.
Figure 7:
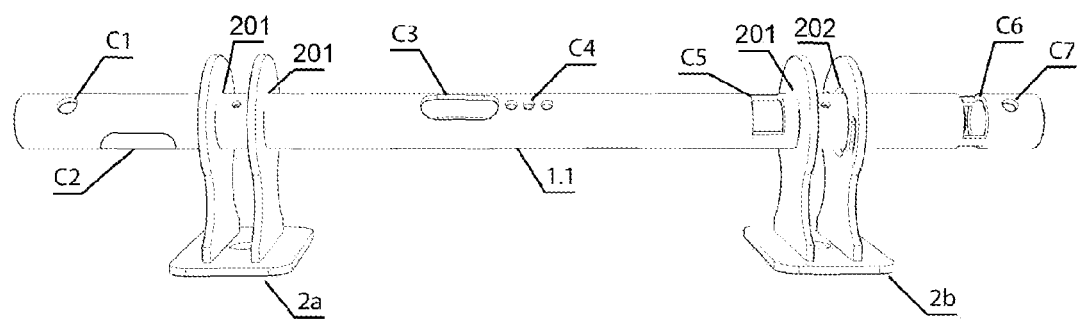
FIG. 7 presents the structural pipe of the lifter seated in openings of mounting lugs.
Figure 8:
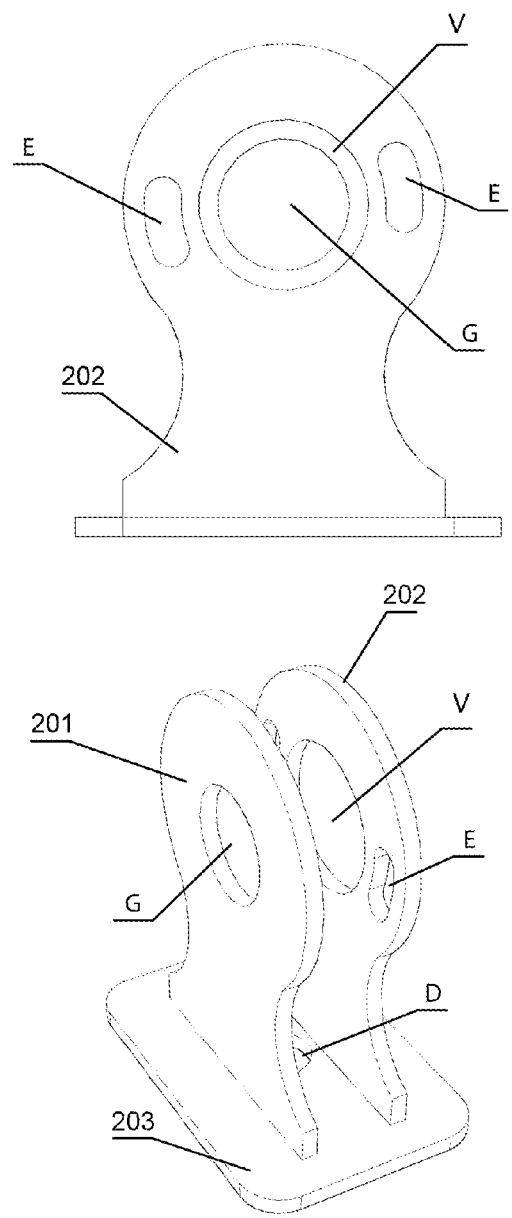
FIG. 8 presents the right mounting lug.
Figure 9:
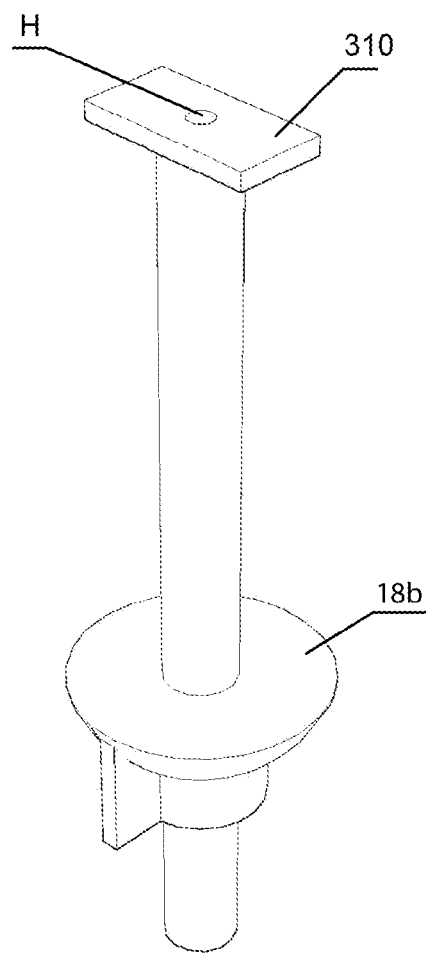
FIG. 9 presents the bolt fastening the lifter to the toilet bowl, FIG. 10 present the right mounting lug with rotary wheel of control gear mounted.
Figure 10:
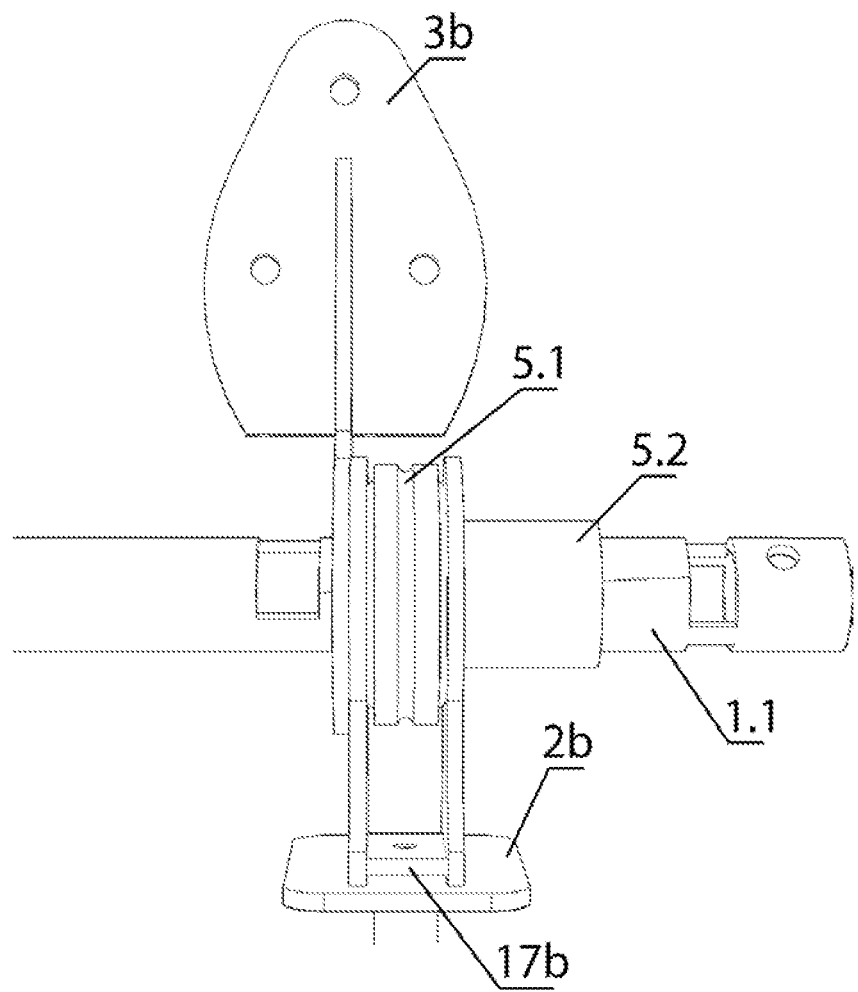
Figure 11:
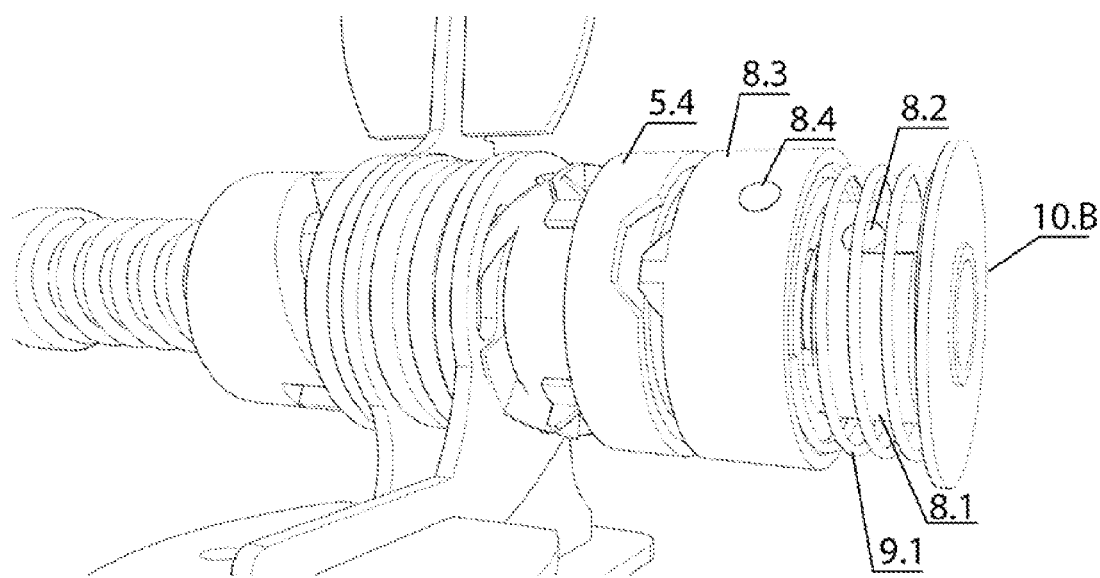
FIG. 11 presents the control gear of the lifter.
Figure 12:
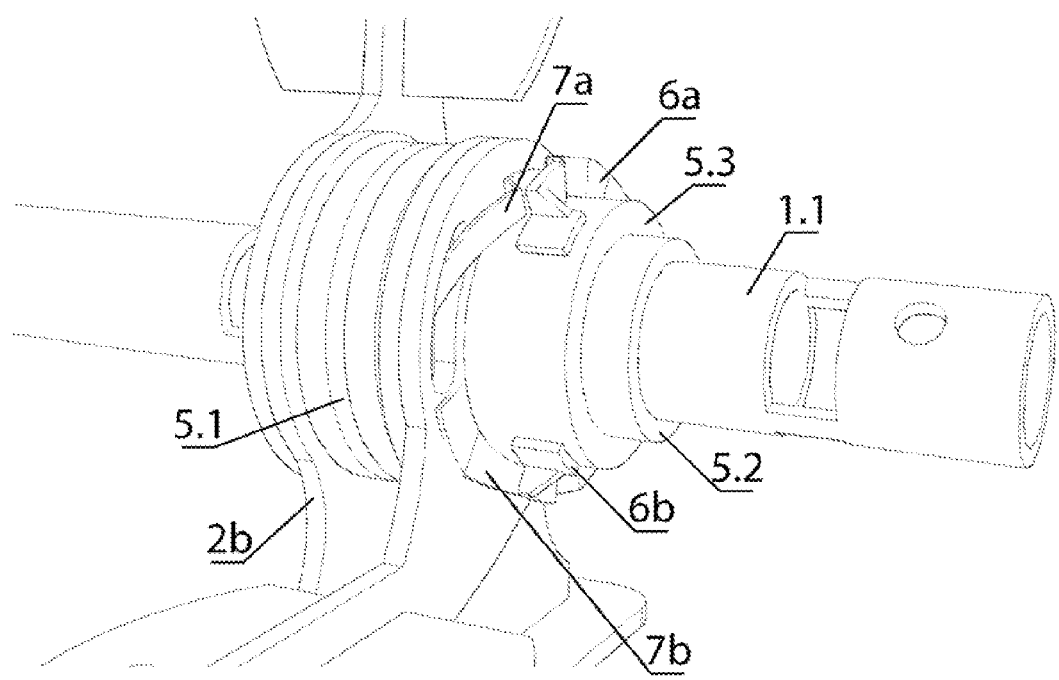
FIG. 12 presents the latches control sleeve.
Figure 13:
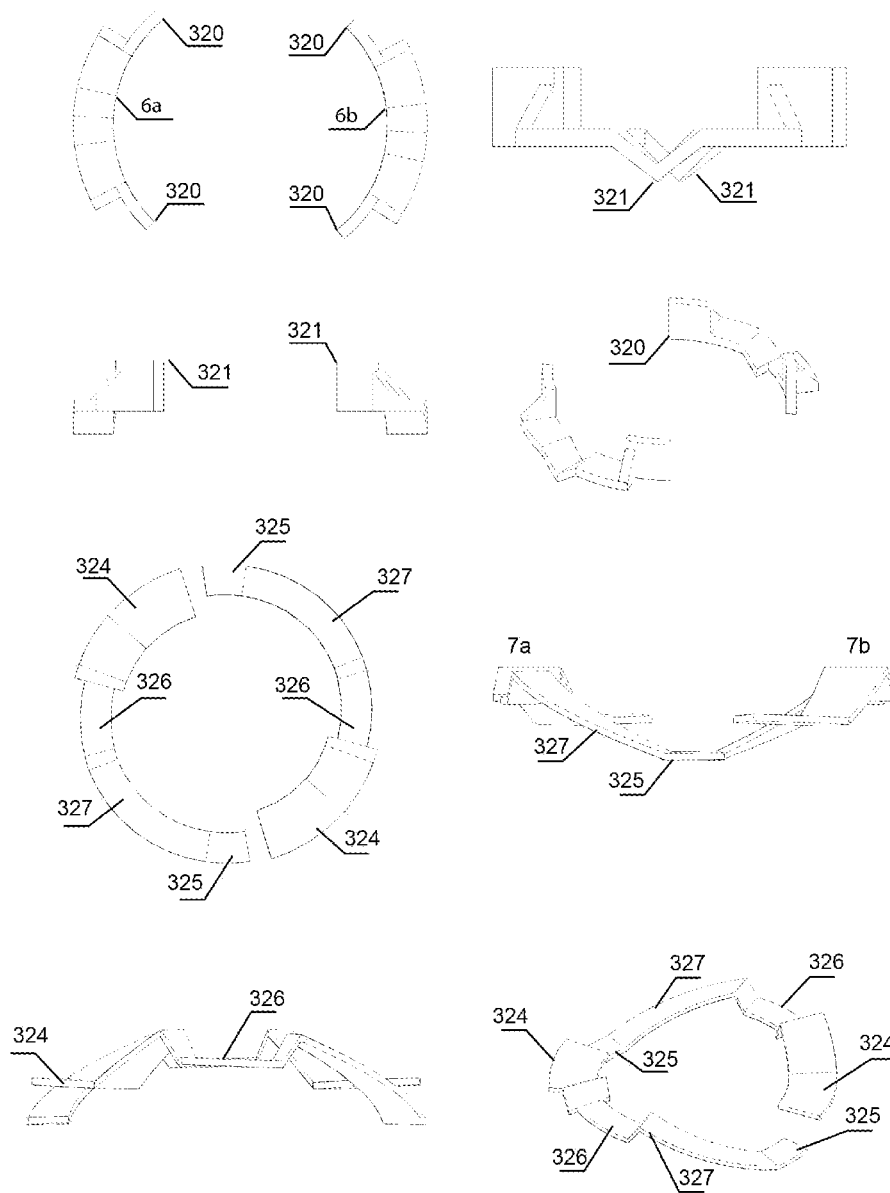
FIG. 13 presents example shapes of latches.
Figure 14:
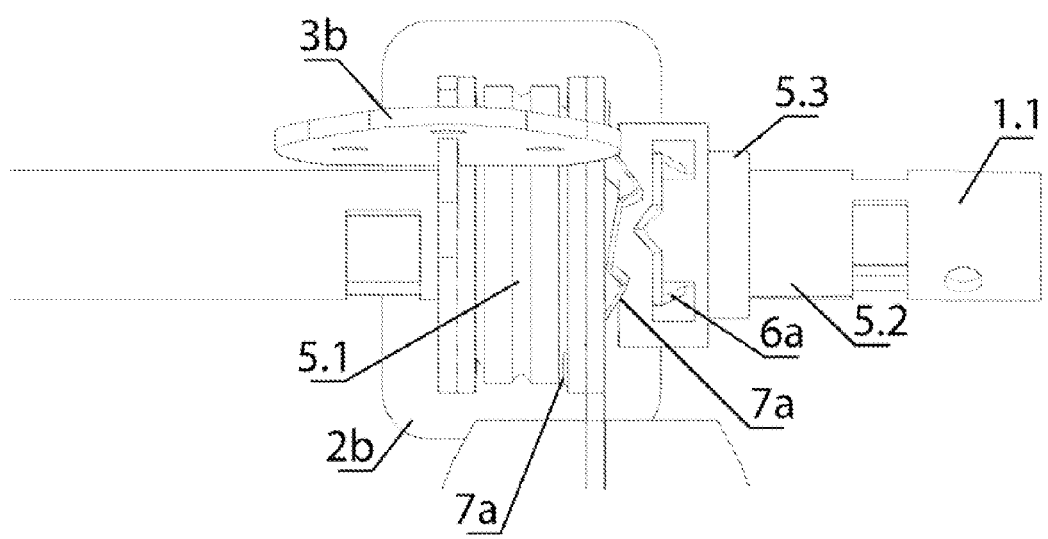
FIG. 14 presents the assembled system of latches in plain view.
Figure 15:
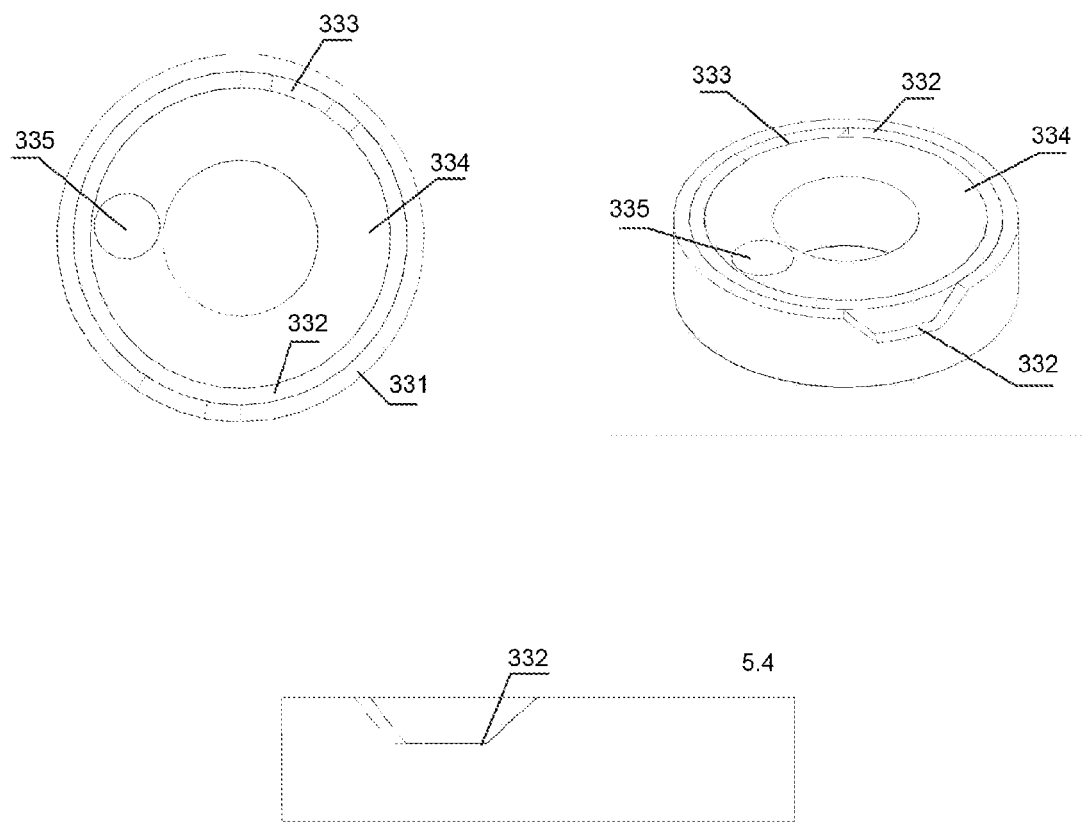
FIG. 15 presents the left rotary ring of the control gear.
Figure 16:
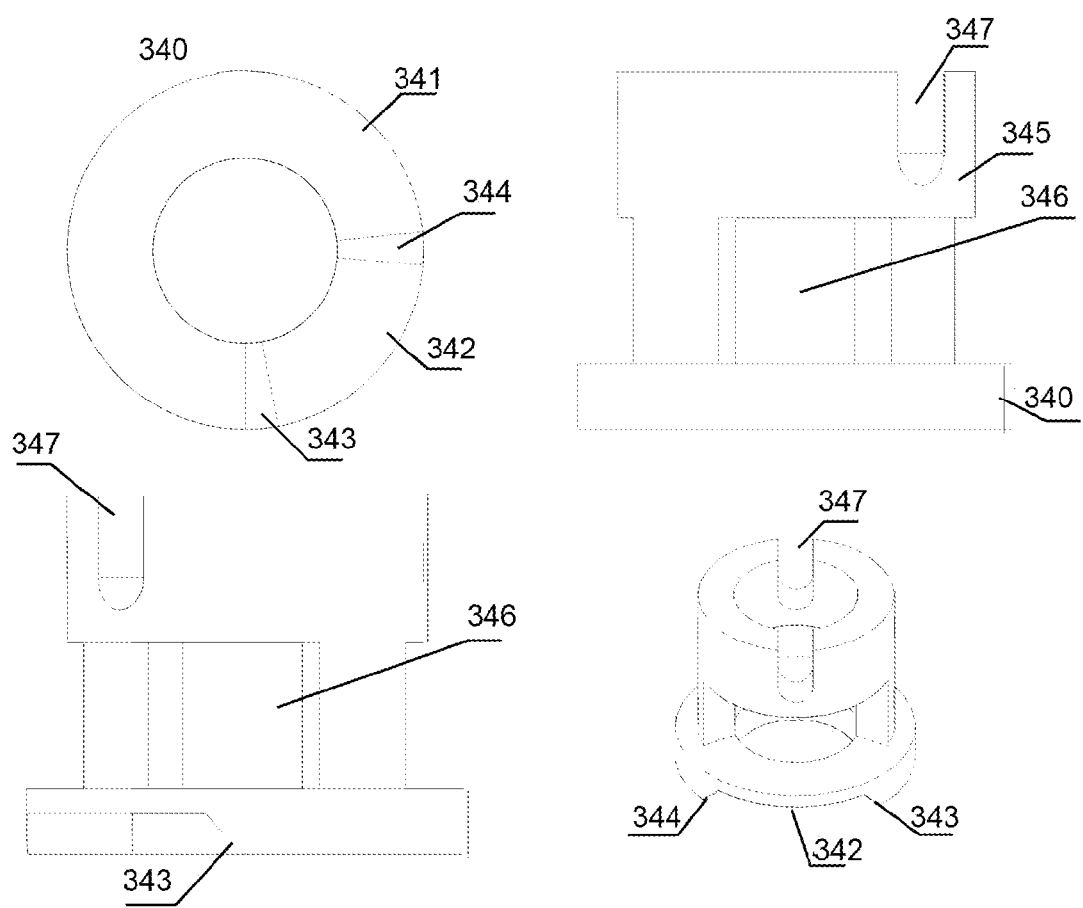
FIG. 16 presents the disconnecting sleeve of the control gear.
Figure 17:
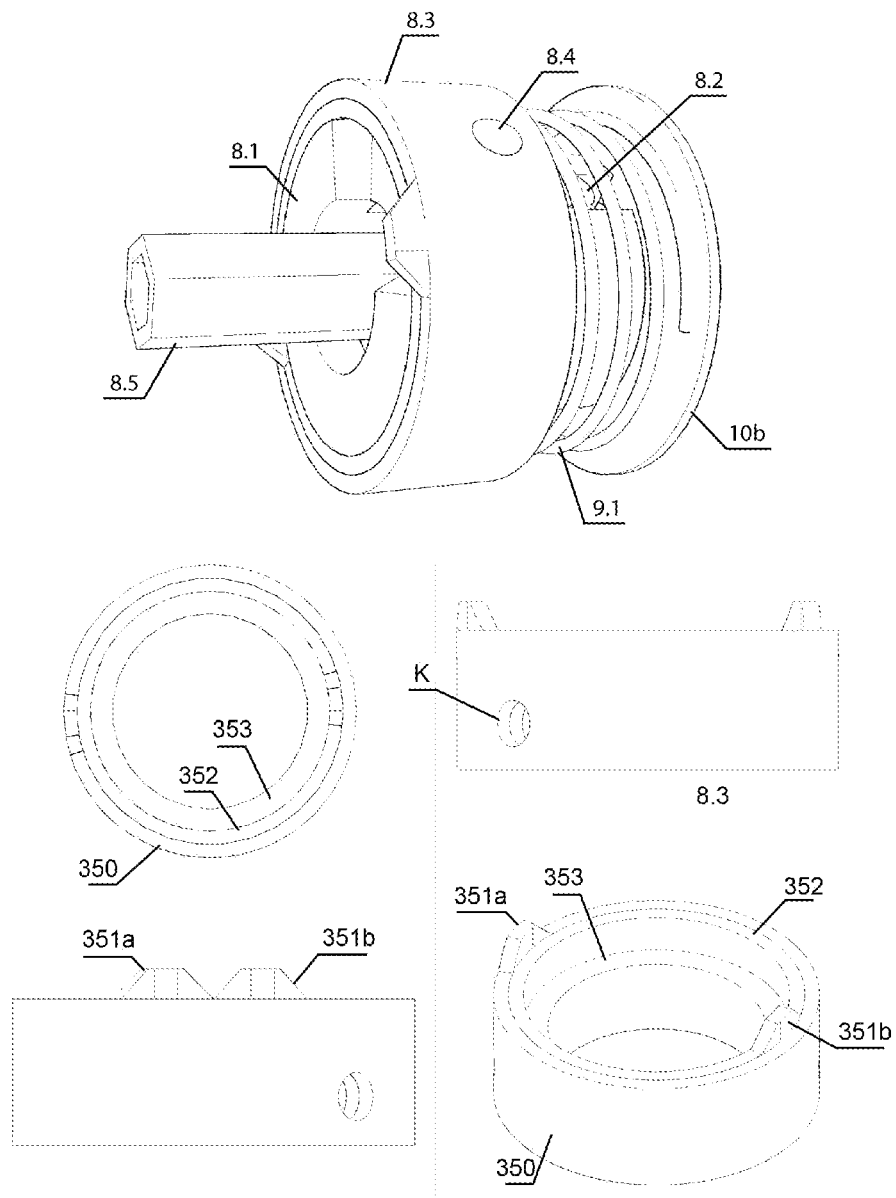
FIG. 17 presents the right ring of the control gear.
Figure 18:
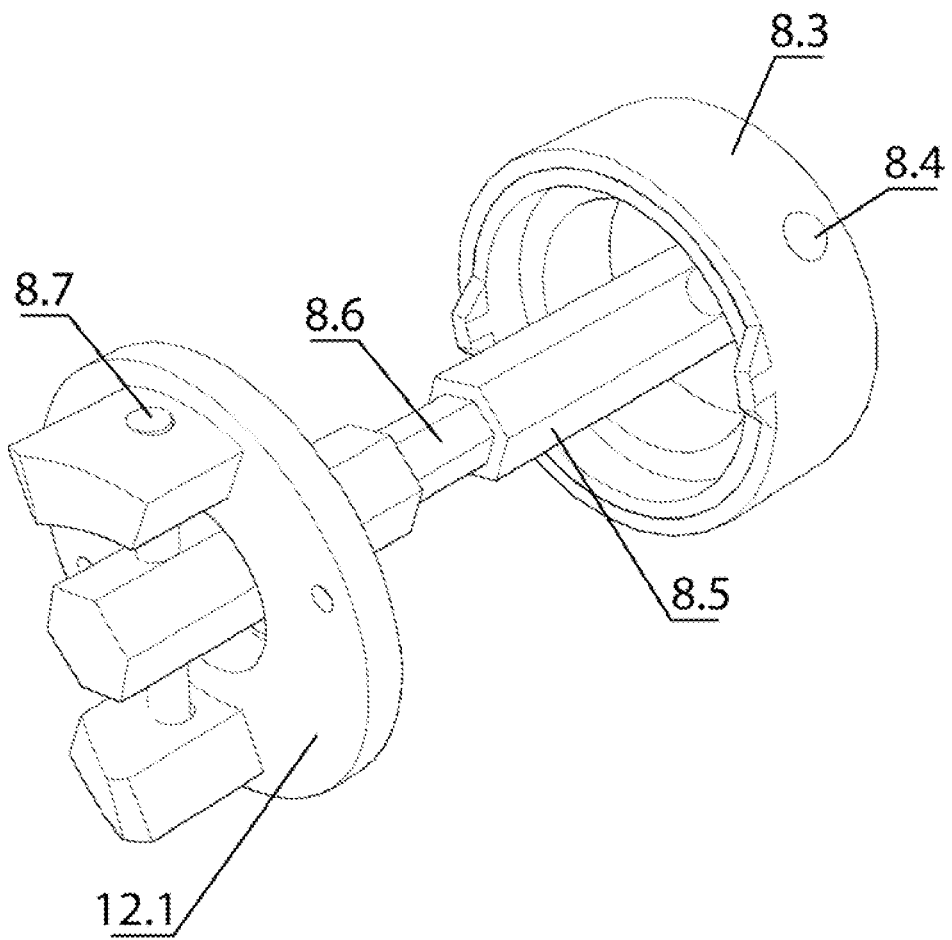
FIG. 18 presents the internal connecting members of the control gear with the right rotary module of the lifter.
Figure 19:
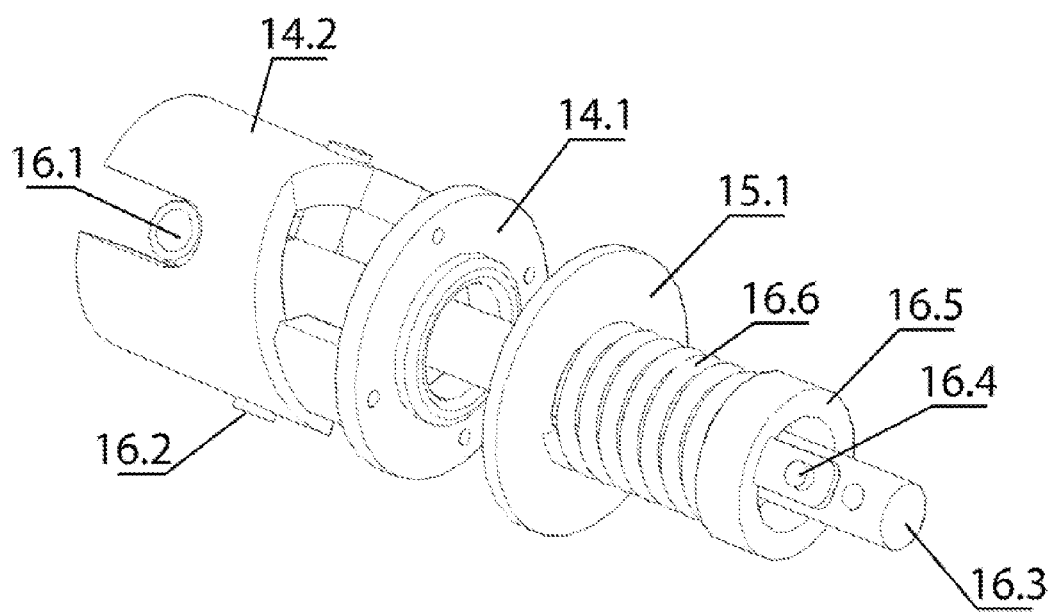
FIG. 19 presents the left rotary actuator of the lifter.
Figure 20:
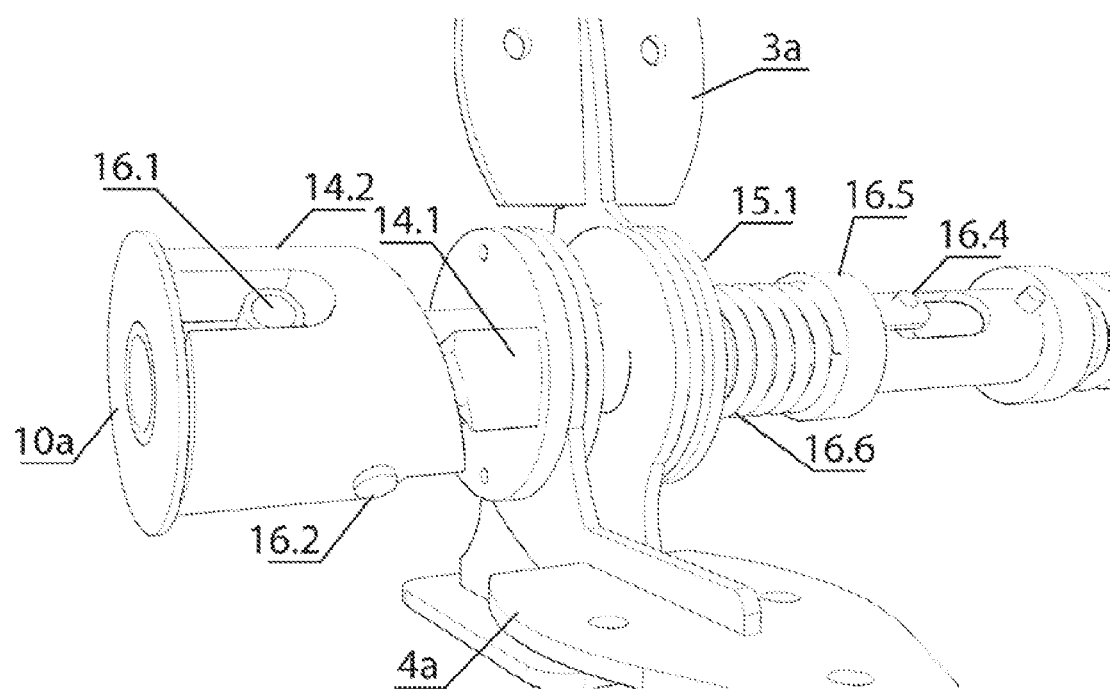
FIG. 20 presents the left part of the lifter.
Figure 21:
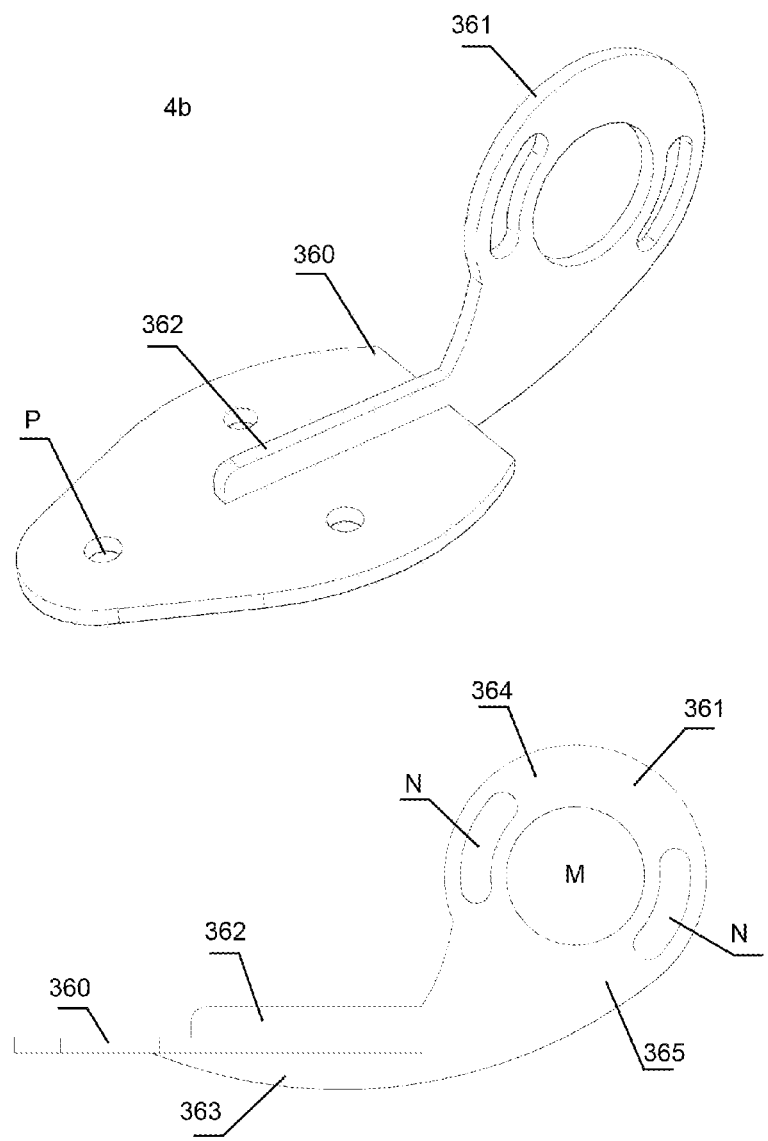
FIG. 21 presents the right hinge of toilet seat.
Figure 22:
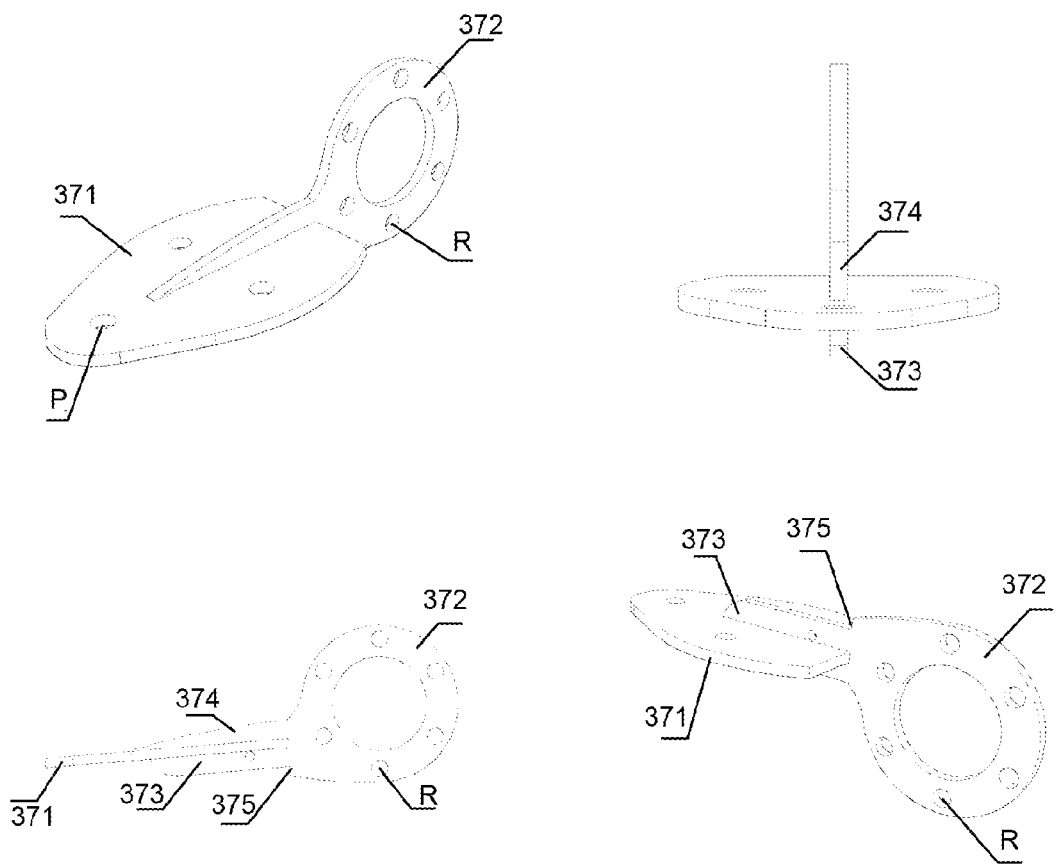
FIG. 22 presents the right hinge of toilet cover.
Figure 23:
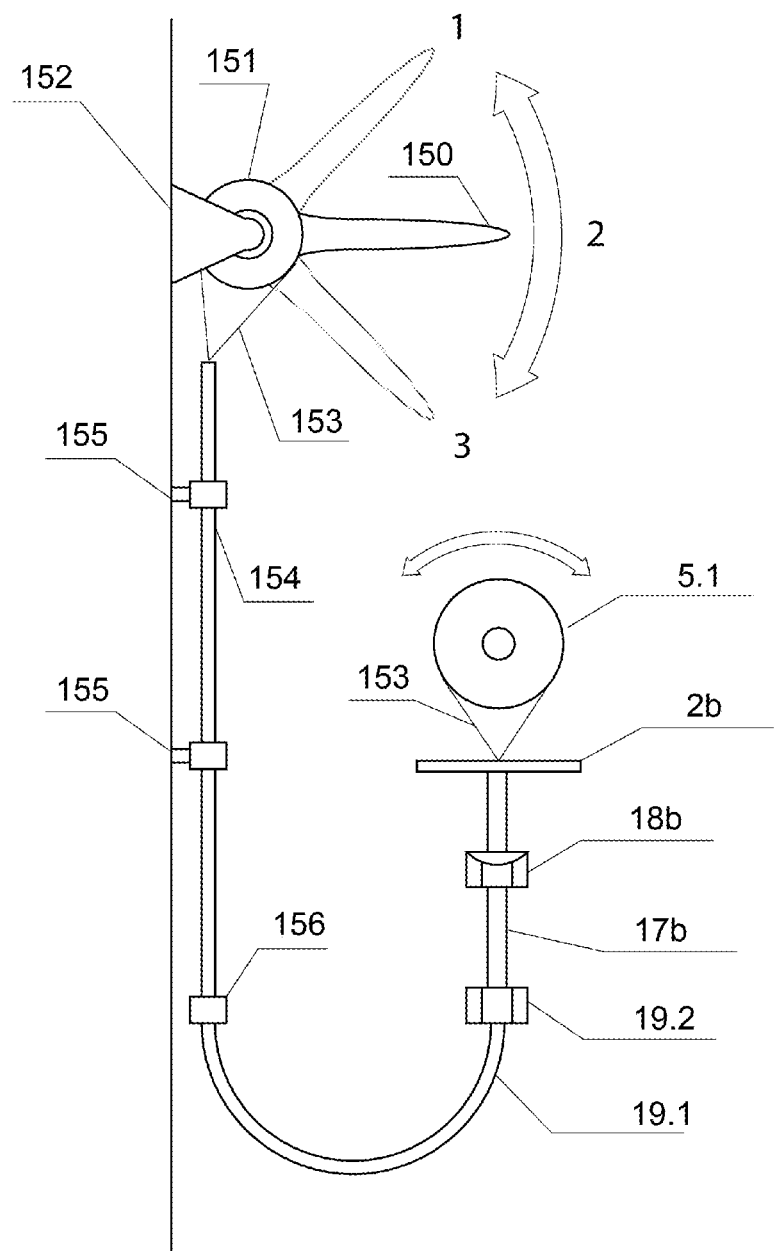
FIG. 23 presents an operating diagram of the control device.
Figure 24:
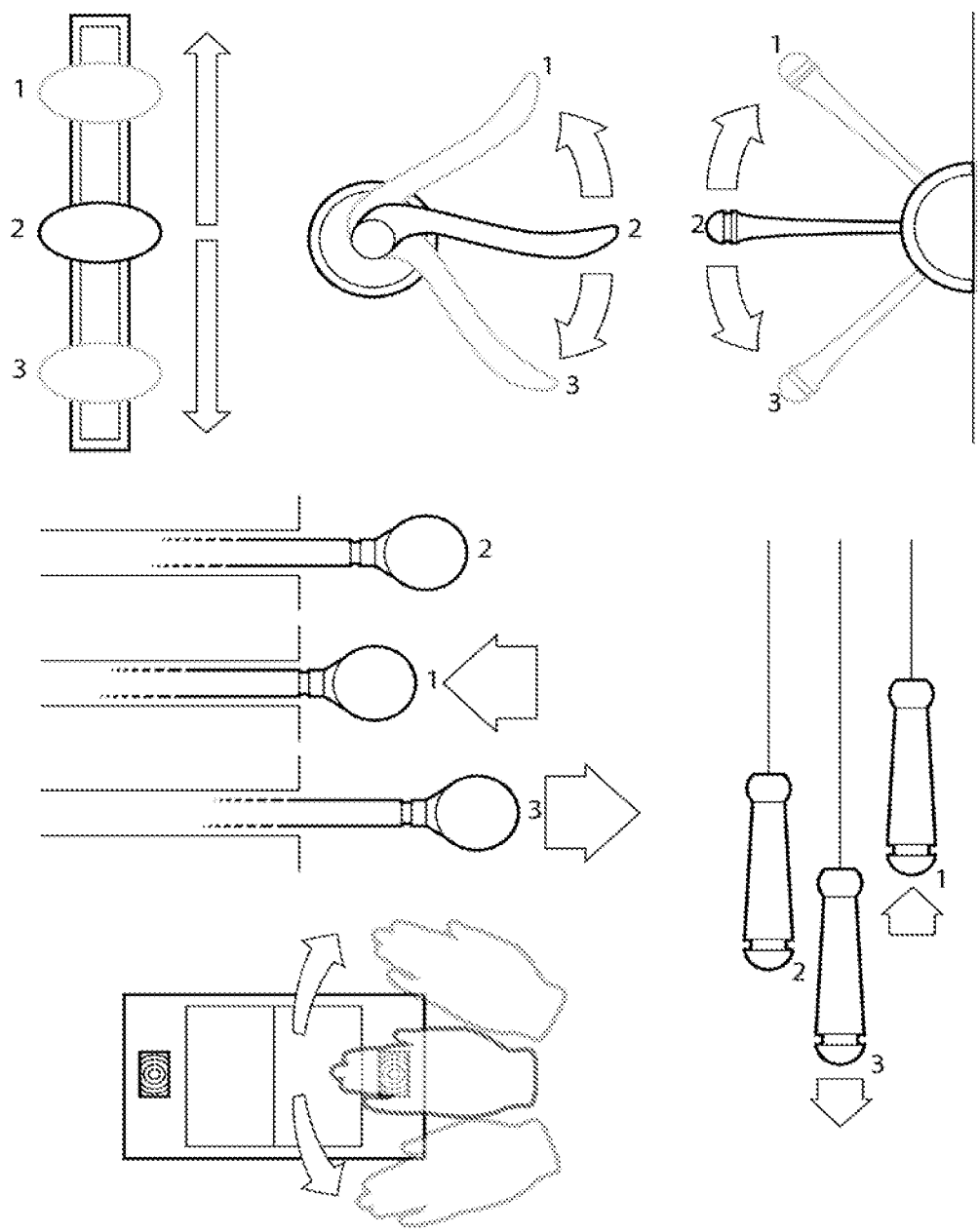
FIG. 24 and FIG. 25 present example solutions of the lifter control.
Figure 25:
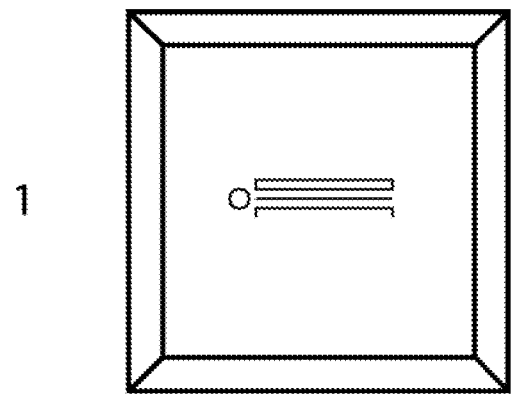
Figure 25:
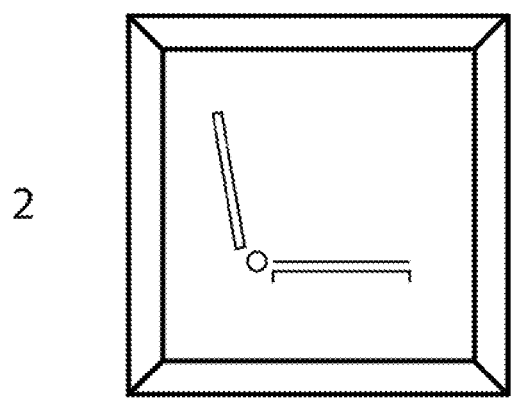
Figure 25:
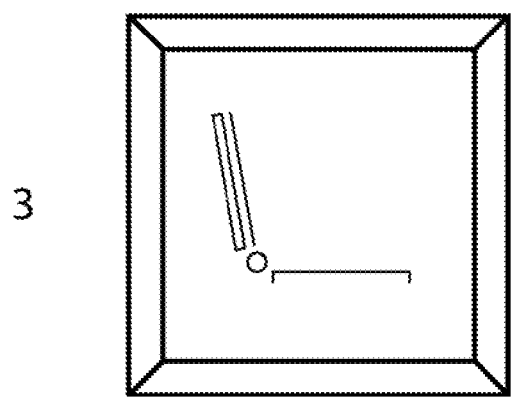

The 1.1 structural pipe is seated in G openings of 2a and 2b mounting lugs 201 and 202 holders. The 1.1 structural pipe features C1 lengthwise opening for the seating of 16.1 mandrel limiting reciprocating motion of 14.2 module, C2 opening of 16.2 mandrel connecting 14.2 module with 16.6 spring through 16.3 internal connecting member, C3 opening enabling the reciprocating connection of 16.3 internal connecting member with a 16.5 sleeve, C4 openings fastening 13.2 thrust sleeve of 13.3 spring through 13.1 mandrel, C5 opening of 8.7 peg rotation, C6 opening of 8.4 peg rotation, as well as the C7 opening for the seating of the 8.2 mandrel that protects 8.1 disconnecting sleeve against performing of rotary motion. The 16.6 and 13.3 springs with 16.5 and 13.2 rings are seated between 2a and 2b mounting lugs on the 1.1 structural pipe. The 16.6 spring presses on 15.1 spacer sleeve with 3a left cover hinge seated. The 13.3 compression spring presses through 11.1 right reciprocating module on the 12.1 right rotational module, linked with 3b right hinge of the cover. The 12.1 right rotary module is connected with 8.6 left internal connecting member by means of 8.7 peg. The 10a housing ring, 14.2 left reciprocating module with 16.1 mandrel as well as 16.2 fastening peg are seated on the left end of 1.1 structural pipe. The 14.2 left reciprocating module is coupled with 16.6 spring by means of 16.2 peg, 16.3 internal connecting member, 16.4 peg and 16.5 sleeve. The 4a left hinge of toilet seat is mounted on the 14.1 left rotary module. The 10b thrust ring of 9.1 spring pressing against the 8.3 right rotational control ring is fastened on the right end of the 1.1 structural pipe. The 8.3 control ring features 351a and 351a teeth from its left side. The 9.1 spring and 8.3 ring are seated on 8.1 disconnecting sleeve. The 8.3 rotary control ring is coupled with 8.5 internal connecting member by means of 8.4 peg. The right part of 8.6 internal connecting member is slide introduced into opening of 8.5 connecting member. The 8.6 connecting member is coupled with 12.1 right rotary module by means of 8.7 peg. The 340 left wall of 8.1 disconnecting sleeve collar touches the right wall of 5.4 left control ring by way of 5.5 bearing ball. The 5.4 left rotary control ring features 332 and 333 hollow recesses from its right side. Right wall of the 5.4 left control ring features 335 yoke of 5.5 bearing ball, moving over left side of 8.1 disconnecting sleeve 341 collar. The 5.4 left control ring is combined with 5.2 rotary sleeve. The 5.3 sleeve that controls latches together with 6a and 6b latch components mounted on circumference is seated between 5.4 left control ring and 4b right hinge of the toilet seat on the 5.2 rotary sleeve. The 4b right seat hinge features 362 mounting feather, 364 and 365 points of 7a and 7b latches mounting, N openings for seating tips of 7a and 7b latches, as well as P assembly openings. The 7a and 7b latches are also seated in E openings of 2b mounting lug 202 right holder. Between the 201 left holder and 202 right holder of 2*b* right mounting lug, on the 5.2 rotary sleeve, 5.1 rotary wheel of a cable or strand passing through H opening of 17*b* assembly bolt to the lifter control device, is seated. The 2*b* right mounting lug has two holders—the left one 201 and the right one 202. The 201 left holder has G opening for the seating of 1.1 structural pipe. The right holder 202 has V opening for free seating of 5.2 rotary sleeve. The 201 and 202 holders are mounted in the 203 base of the 2*b* right mounting lug. The D opening, serving for the seating of 17*b* mounting bolt is placed between the mounts of 201 and 202 holders. The 17*b* mounting bolt features external thread for 18*b* fastening nut travel, as well as 310 head. Inside, along its whole length, the 17*b* mounting bolt has H an opening for the seating of 153 cable or strand. The 17*a* fastening bolt is mounted to 2*a* left mounting lug. The control device has the 150 arm of 151 rotary wheel travel, which is seated in the 152 holder. The 153 cable or strand, which the opposite end is fastened to 5.1 rotary wheel of the lifter control gear, is fastened to 151 rotary wheel of the control device. The 153 cable or strand passes through 154 housing and 19.1 housing on the section between the 151 and 5.1 wheels, as well as through H the opening of 17*b* mounting bolt. Rotary arm of 4*a* left seat hinge and rotary arm of 3*b* right cover hinge have openings on their circumference, in which 20*a* and 20*b* bearing balls are placed. Central part of W housing is intended for the determination of the lifter characteristics.

The rotary spring-loaded actuator is composed of 1.1 structural component, on which 11.1 reciprocating module is seated. Body of the 11.1 reciprocating module is equipped with a guide of 16.1 mandrel. The 13.3 spring, supported against 13.2 ring presses on the reciprocating module.
13.2 ring is wedged with 13.1 peg. The 11.1 reciprocating module contacts directly the 12.1 rotary module. The 12.1 rotary module is coupled with 401 component. The 401 component is coupled with 400 weigh and with 402 holder of the actuator control. The 11.1 reciprocating module touches the 12.1 rotary module by way of shaped 450 and 451 attack surfaces.

The toilet seat lifter enables the lifting and lowering of the cover and/or toilet seat by means of a lifter control device or manually. Methods of lifting the toilet lid with the lifter mounted on it in accordance with aspects of the disclosed are not mutually exclusive. Lifting of the toilet seat by means of a lifter control device does not exclude the manual lowering of the toilet seat. Manual lowering or lifting of toilet seat does not exclude lifting or lowering it by means of the lifter control device.

Figure 26:
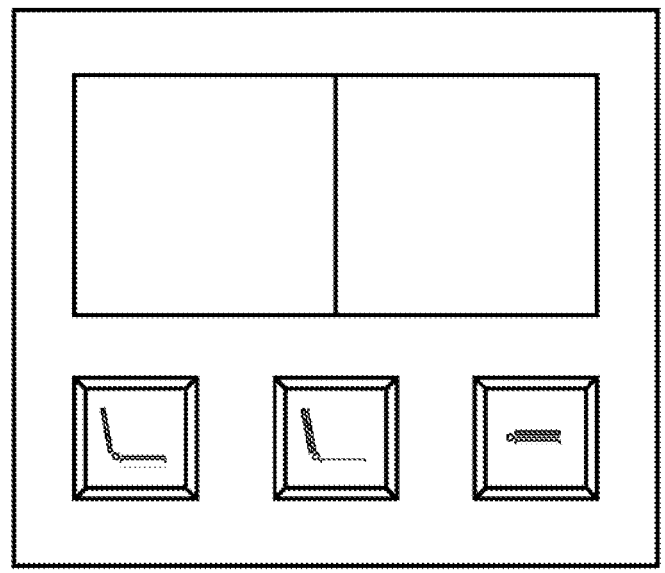
FIG. 26 presents switches of the control device mounted in a single enclosure with a toilet bowl flushing push-button.
Figure 26:
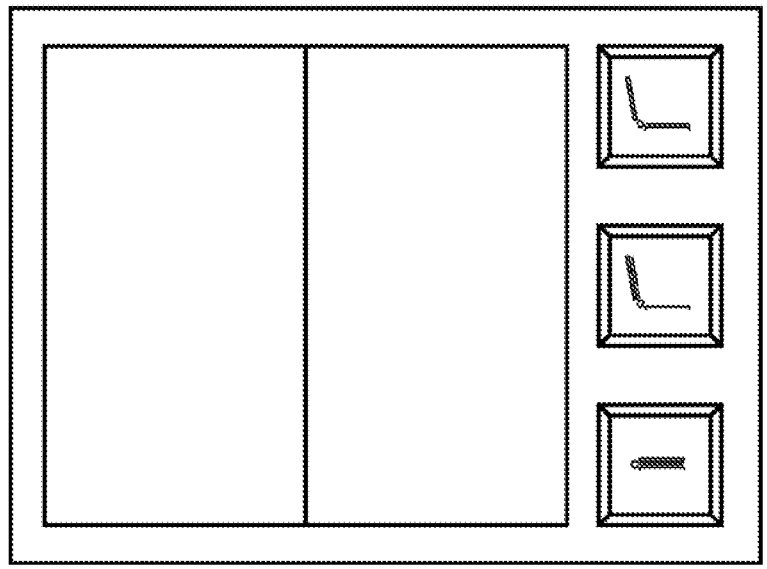
Figure 29:
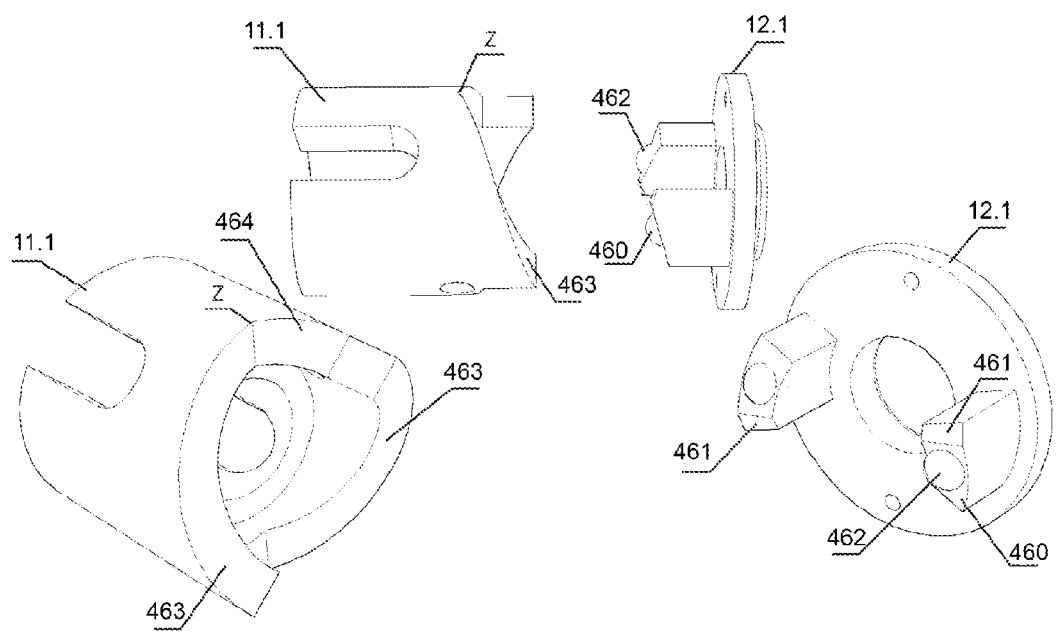
FIG. 29 presents a reciprocating module and rotary module of toilet seat lifter.

Description of the toilet seat lifter, as shown in the example design in the drawings from FIG. 1 up to FIG. 26 and FIG. 29. These figures present the state of the equipment, when the cover of the toilet seat is lifted, while its seat rests on the toilet bowl.

Use of the lifter as invented for the lifting of the toilet seat cover, from home condition when the seat and its cover are resting on the toilet bowl, the 9.1 spring of control gear and 13.3 right spring of the lifter are tensioned, and the arm of lifter control device is in position 1, consists in that, in order to lift the cover of toilet seat, the arm of control device is shifted from position 1 to position 2. In result of shifting the control device arm, and consequential travel of 153 cable or strand, rotation of 5.1 rotary wheel occurs. Rotation direction of 5.1 rotary wheel conforms to the direction of toilet seat cover motion, which is fastened to 3*a* and 3*b* hinges. The 5.1 rotary wheel, by way of 5.2 rotary sleeve is coupled with 5.4 left control ring with seated in it 5.5 bearing ball that exerts pressure on 8.1 disconnection sleeve. Rotation of 5.1 rotary wheel with simultaneous rotation of 5.2 rotary sleeve and 5.4 left control ring, results in displacing of 5.5 bearing ball from 341 surface over 343 leap onto 342 surface of 8.1 disconnecting sleeve. Next 8.1 disconnecting sleeve travel proceeds together with 8.3 right rotary control ring mounted on it towards 5.4 left control ring, and engagement of 8.4 right ring with 5.4 left ring of the lifter control gear. This travel proceeds in the result of control gear 9.1 spring pressure. Simultaneously proceeds the shifting of 8.5 internal movable right connecting member along 8.6 inner left connecting member, coupled with 12.1 right rotary module of toilet seat cover. The 12.1 right rotary module is coupled with 3*b* hinge of the toilet seat cover. In this instance, 5.5 bearing ball ceases exerting pressure on 341 surface of 8.1 disconnecting sleeve, while 9.1 spring of control gear is in a condition of lesser tension. Further rotation of 5.4 left control ring causes rotation of 8.3 right control ring, rotation of 8.5 and 8.6 internal connecting members, hence rotation of 12.1 right rotary module and 3*b* right hinge together with the cover of toilet seat. Lifting of the toilet seat cover proceeds. Together with the 12.1 right rotary module rotary motion, the 11.1 right reciprocating module moves along the 1.1 structural pipe, exerts constant pressure on the 12.1 right rotary module. Process of 13.3 the right compression spring expanding proceeds. Pressure of 11.1 right reciprocating module assists the rotary motion of 12.1 right rotary module, and hence the lifting of the toilet seat cover. This motion is controlled by the user through the motion of the control device arm towards pos. 2. Lifting of the cover will stop in the moment when 5.5 the bearing ball has moved from 342 surface over 344 leap onto 341 surface of 8.1 disconnecting sleeve. During this relocation, the 8.1 disconnecting sleeve executes longitudinal motion along 1.1 structural pipe, while pushing the 8.3 right rotary control ring away from 5.4 left control ring. 351*a* and 351*a* teeth of 8.3 ring are creeping out the 332 and 333 openings of 5.4 ring. Then, the drawing aside of the 8.5 and 8.6 internal connecting members takes place and disconnection of 5.4 and 8.3 rotary control rings. When the arm of the control device reaches position 2, the cover of toilet seat is up, the 9.1 spring of control gear is under tension, while the 13.3 right compression spring is in lower tension state. The 12.1 right rotary module is seated in the deepest position of 11.1 right reciprocating module Z seat.

Use of the lifter as invented for lifting the toilet seat, from the home condition when the seat is resting on the toilet bowl and the cover is up, the 9.1 spring of control gear and 16.6 left compression spring of the lifter are tensioned, and the arm of lifter control device is in position 2, consists in that, in order to lift the toilet seat, the arm of control device is shifted from position 2 to position 3. In result of the control device arm shifting towards position 3, and consequential 153 cable or strand travel, rotation of 5.1 rotary wheel takes place. The 5.1 rotary wheel causes rotation of 5.3 latches control sleeve with 6*a* and 6*b* latch components mounted, by means of 5.2 rotary sleeve of control gear. Rotation of 5.3 latches control sleeve forces the engagement of 6*a* and 6*b* latch components with 7*a* and 7*b* latches fastened to 4*b* right seat hinge. Further rotation of 5.1 rotary wheel and simultaneous rotation of 5.3 latches control sleeve, forces rotary motion of 4*b* right seat hinge, which by way of the toilet seat is coupled with 4*a* left seat hinge, the said 4*a* seat hinge being coupled with 14.1 left rotary module. During the rotation of 14.1 left rotary module, the 14.2 left reciprocating module performs longitudinal motion along the 1.1 structural pipe, exerting constant pressure on 14.1 rotary module. Process of 16.6 left compression spring expansion takes place, which by means of 16.3 internal connecting member is coupled with 14.2 left reciprocating module, which results in the shifting of 14.2 left reciprocating module, which in turn exerts constant pressure on 14.1 left rotary module. Further rotary motion of 5.3 latches control sleeve and simultaneously 4*b* right seat hinge causes the sliding of 7*a* and 7*b* latches part 321 out of 2*b* right mounting lug 202 holder E openings, and their relocation over the surface of 2*b* right mounting lug 202 right holder right side, and engaging its 327 part with 6*a* and 6*b* latch components seated on 5.3 latches control sleeve. Lifting the toilet seat proceeds until 14.1 left rotary module is located in the deepest position of 14.2 left reciprocating module Z seat, the 16.6 left compression spring reaches state of lower tension, and the arm of control device reaches position 3.

Use of the lifter as invented for lowering the toilet seat from home condition when both the seat and the cover are raised, and arm of the lifter control device is in position 3 consists in that, in order to lower the toilet seat one should relocate the arm of control device from position 3 to position 2. Motion of the control device arm towards position 2, in result of 153 cable or strand travel, causes the rotation of 5.1 rotary wheel in the direction opposite to that during the lifting of the seat. The 5.1 rotary wheel puts in rotary motion the 5.3 latches control rotary sleeve of lifter control gear by way of 5.2 rotary sleeve. During the rotation of 5.3 latches control sleeve, 6*a* and 6*b* latch components seated on the sleeve are pressing on the 7*a* and 7*b* latches, thus actuating the rotation of 4*b* right seat hinge, hence 4*a* left seat hinge. Simultaneously the rotation of 14.1 left rotary module takes place, which will start the process of pushing the 14.2 left reciprocating module out. The process of pushing the 14.2 left reciprocating module out by the 14.1 left rotary module is assisted by the weight of falling toilet seat. The 14.2 reciprocating module shifted by 16.3 connecting member will start tensioning of 16.6 left compression spring. The 6*a* and 6*b* latch components will exert constant pressure on 7*a* and 7*b* latches until they are disconnected again. Disconnection of the latch elements will take place after the part 321 of 7*a* and 7*b* latches is slid into 2*b* right mounting lug 202 right holder E openings again. In the moment of the latches' disengagement, the toilet seat will rest on the toilet bowl. The arm of control device while aiming towards position 2, performs yet a slight rotation of 5.3 latches control sleeve with 6*a* and 6*b* latch components, which results in a bigger distance of 6*a* and 6*b* latch components in relation to 7*a* and 7*b* latches. In case of manual lifting of the seat, such state of the gear enables 7*a* and 7*b* latches to pass-by the 6*a* and 6*b* latch components without any resistance.

Use of the lifter as invented for lowering the cover of the toilet seat, from the home condition when the seat is resting on the toilet bowl and the cover is up, and the arm of the lifter control device is in position 2, consists in that, in order to lower the cover of toilet seat, the arm of control device is shifted from position 2 to position 1. In result of the control device arm shifting towards position 1, and consequential 153 cable or strand travel, the rotation of 5.1 rotary wheel takes place. Rotation direction of 5.1 rotary wheel coupled by means of 5.2 sleeve with 5.4 left rotary ring is opposite to that during the cover lifting. Return movement of 5.4 left control ring rotary sleeve takes place, and repeated relocation of 5.5 bearing ball from 341 surface over 344 leap onto 342 surface of 8.1 disconnecting sleeve, thus the repeated coupling of 5.4 left control ring rotary sleeve with 8.3 right rotary control ring will take place. The cover of the toilet seat will start falling motion, assisting by its weight rotation of 12.1 rotary module, which in turn pushes 11.1 reciprocating module out, and starting process of 13.3 right compression spring tensioning. Falling of the toilet seat cover is continued until 5.5 bearing ball by exerting of pressure on 343 leap will shift the 8.1 disconnecting sleeve, while simultaneously disconnecting 8.3 right rotary control ring from 5.4 left rotary control ring. In the moment of the rings disconnection, the cover of toilet seat rests on the toilet bowl.

In case of the manual lifting and lowering of the toilet seat with a mounted lifter, as invented, the lifting of the cover does not require additional action disconnecting the lifting gear. In case of cover standstill on the toilet bowl, when the control device is set in position 1, the 5.5 bearing ball presses on 341 surface of 8.1 disconnecting sleeve and, therefore, preventing the 8.3 right rotary control ring from coupling with 5.4 left control ring. Manual lifting of the toilet seat does not encounter the mechanical resistance of the lifter. Right rotary spring-loaded lifter actuator assists manual lifting of the cover. Manual free lifting of the cover is continued until 12.1 right rotary module locates in the deepest position of 11.1 right reciprocating module Z seat, and right spring is in the lower tension state. This arrangement causes the setting of the cover of toilet seat in the lifted position, preventing resting it against the wall or toilet cistern. Further manual deflecting of the cover will encounter increasing resistance of right rotary actuator of the cover, caused by increased pressure of 13.3 spring. Increased pressure of 13.3 spring is caused by the pressure of 12.1 rotary module 450 surface on 451 surface of the 11.1 reciprocating module. During the annual lowering of the toilet seat cover, rotary spring-loaded lifter actuator prevents the free falling of the cover on the toilet bowl.

In case of the manual lifting and lowering of the toilet seat with a mounted lifter, lifting of the seat does not require additional actions, disconnecting the lifting gear. In standstill condition of the seat on toilet bowl, the 6*a* and 6*b* latch components mounted on the 5.3 latches control sleeve do not block rotary motion of 7*a* and 7*b* latches coupled with 4*b* right seat hinge. Manual lifting of the seat is assisted by the left rotary spring-loaded lifter actuator, which simultaneously positions the seat after being manually lifted in the vertical lifted condition, while maintaining its slight clearance from the lifted cover of the toilet seat. Further deflecting of the seat causes the occurrence of increased resistance. This resistance is caused by pressure of 14.1 rotary module 450 surface on 451 surface of 14.2 reciprocating module, which results in tensioning of 16.6 left compression spring. After releasing of the pressure acting on the seat, the lifter gear aims to set the seat in vertical position again. During the manual lowering of the seat, the left rotary spring-loaded actuator prevents the free falling of the seat on the toilet bowl.

Figure 27:
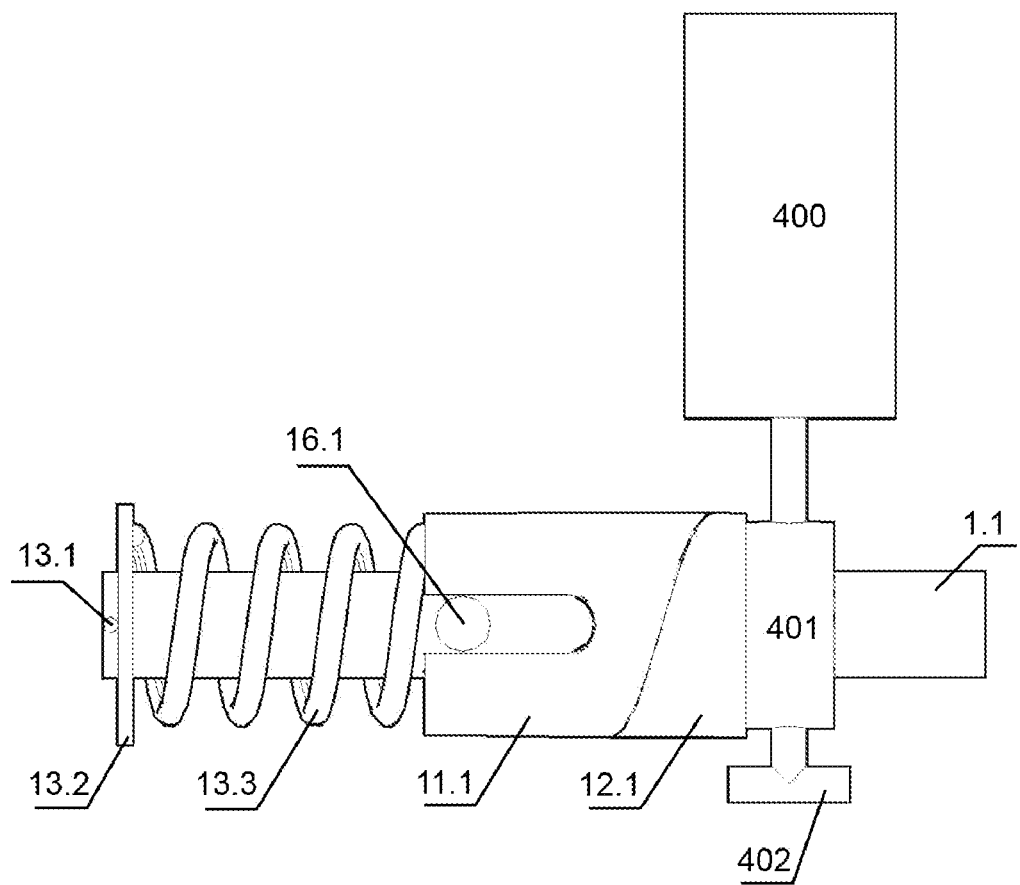
FIG. 27 presents the rotary spring-loaded actuator.
Figure 28:
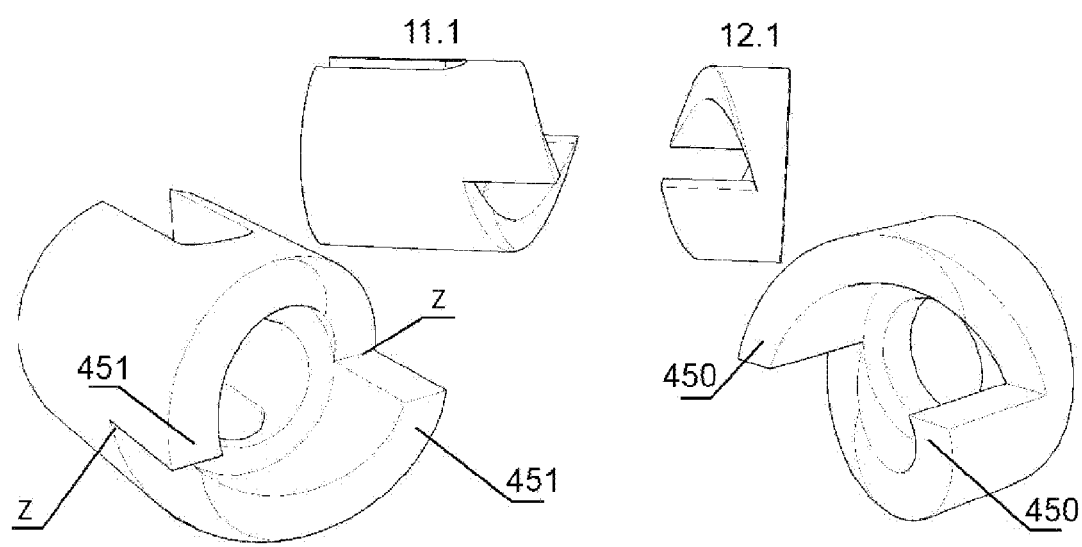
FIG. 28 presents the rotary module and reciprocating module of the actuator.
Figure 31:
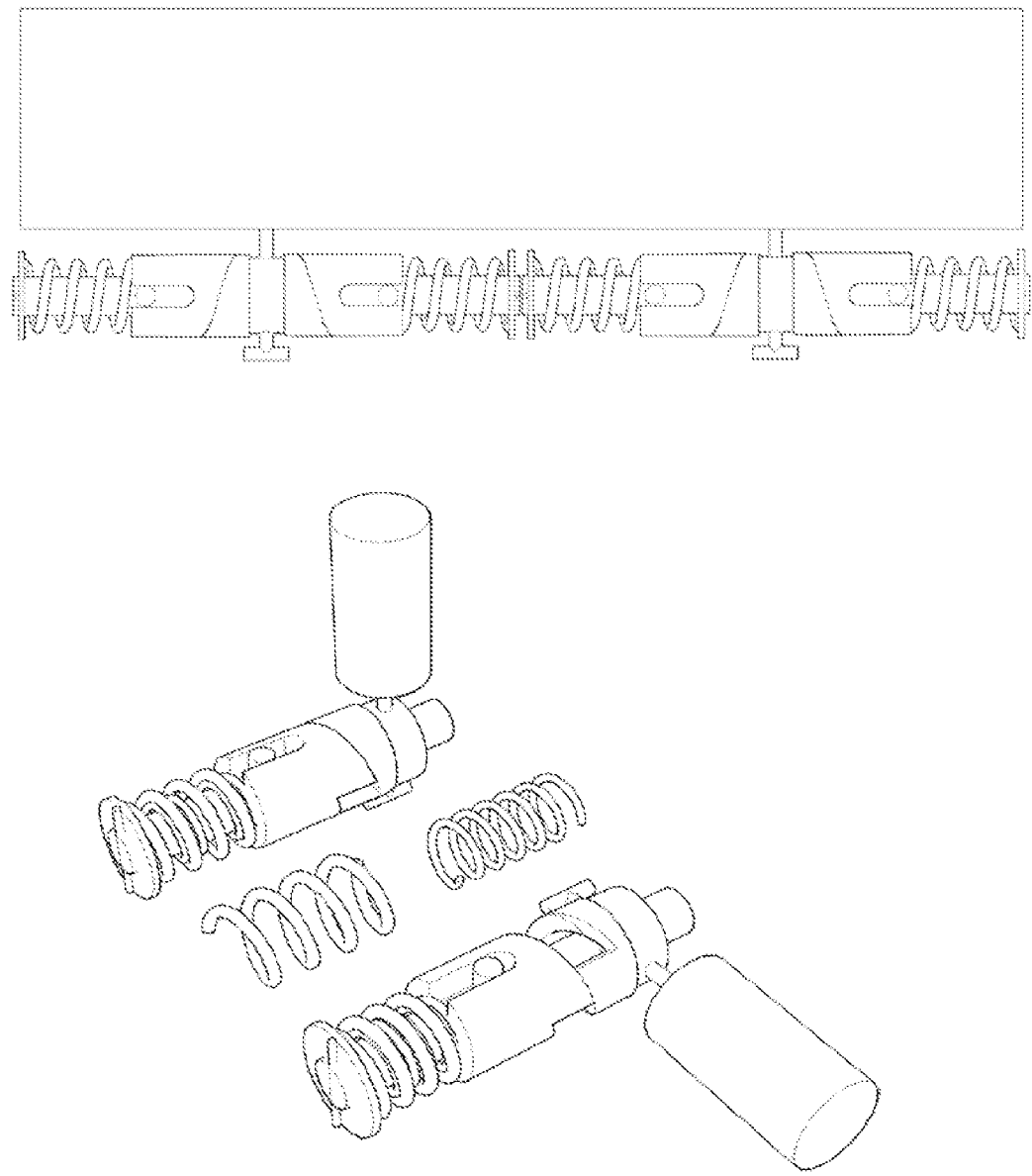
FIG. 31 presents rotary spring-loaded actuator of increased output.

Description of the operation of the example rotary spring-loaded actuator shown in the drawings from FIG. 27 up to FIG. 31.

Figure 30:
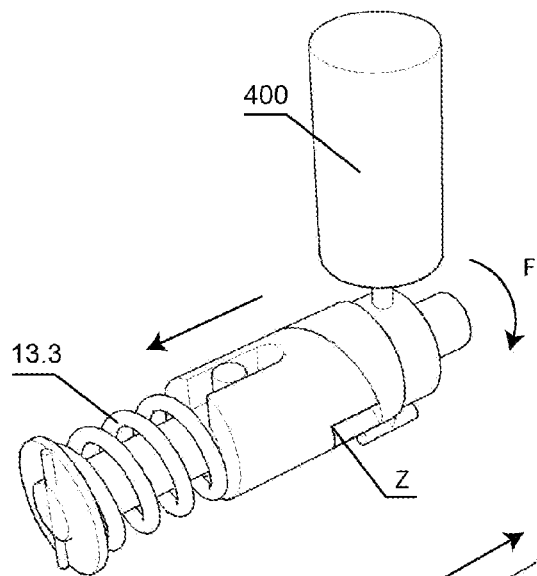
FIG. 30 presents the operating principle of the rotary spring-loaded actuator.
Figure 30:
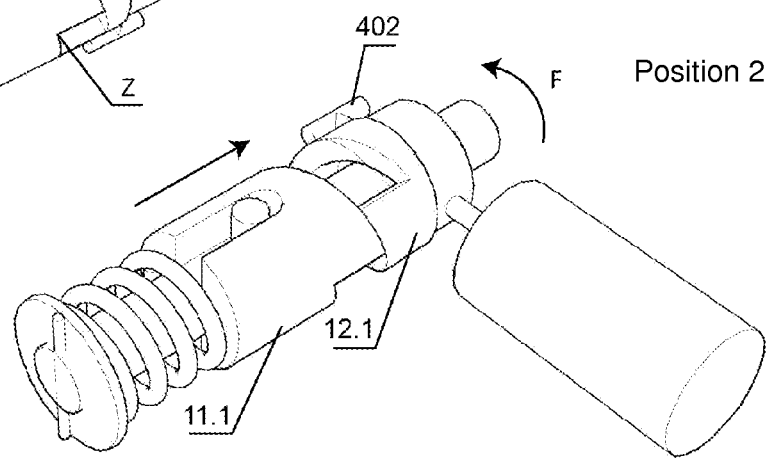

Operation of the example rotary spring-loaded actuator as invented is divided into two cycles of actuator operation as presented in the FIG. 30 drawing as position 1 and position 2.

Position 1—is a condition, in which the rotary spring-loaded actuator is ready to operate in cycle 1.

Position 2—is a condition, in which the rotary spring-loaded actuator is ready to operate in cycle 2.

In cycle 1, the 12.1 rotary module executes its rotary motion in the result of external F force action applied to 402 holder. The 12.1 rotary module is coupled with 400 component. The F external force must be higher than 13.3 spring resistance force. Attack surfaces, 450 of rotary module and 451 of reciprocating module are moving relative to each other. The 12.1 rotary module of actuator exerts pressure on 11.1 reciprocating module while it rotates, and sets this module in sliding motion, in result of which spring tensioning takes place. The rotary motion of 12.1 rotary module and, therefore, the pushing of 11.1 reciprocating module out, is assisted by the weight of falling 400 element. Rotary motion of the 12.1 rotary module is translated on the sliding motion of 11.1 reciprocating module. This translation is accomplished by way of formed shapes of module surfaces touching to each other.

In cycle 2, the pressure of 13.3 sprig assists the action of the F external force applied to 402 holder, and sets the 11.1 reciprocating module in sliding motion. The 11.1 reciprocating module during relocation exerts pressure with its 451 contact surface on 450 contact surface of 12.1 rotary module. In result of this pressure, the 11.1 reciprocating module set the 12.1 rotary module in rotary motion. Sliding motion of 11.1 the reciprocating module is translated into the rotary motion of 12.1 rotary module. Spring power and state of its tensioning is directly related to the F force applied to 402 holder during the lifting or lowering of 400 weight.

What is claimed is:

1. A toilet seat lifter comprises:
a spring system;
a cable; and
a control device;
wherein the toilet seat lifter constitutes a rotation axis of a toilet seat cover and a toilet seat;
wherein the spring system comprises a toilet seat cover lifting and lowering a rotational spring-loaded actuator, and a toilet seat lifting and lowering a rotational spring-loaded actuator;
wherein a left hinge (3*a*) of the toilet seat cover is mounted on a spacer sleeve (15.1) and a right hinge (3*b*) of the toilet seat cover is connected with a right rotational module (12.1);
wherein a left hinge (4*a*) of the toilet seat is connected with a left rotational module (14.1) and a right hinge (4*b*) of the toilet seat is mounted on a rotational sleeve of a control gear;
the right hinge (4*b*) of the toilet seat has a mounting feather (362) and the right hinge (3*b*) of the toilet seat cover has a mounting feather (373) and the right hinge (4*b*) and the right hinge (3*b*) are mounted along a structural pipe (1.1) that has mounting holes (C1, C2, C3, C4, C5, C6, C7) for the mounting of lifter components, while the structural pipe (1.1) is seated in openings (G) of holders (201), (202) of mounting lugs (2*a*) and (2*b*);
wherein compression springs together with spacer sleeves are seated between the mounting lugs (2*a*) and (2*b*) on the structural pipe (1.1), a left compression spring (16.6) is supported against the spacer sleeve (15.1) together with the left hinge (3*a*) of the toilet seat cover, while a right compression spring (13.3) presses through a right reciprocating module (11.1) on a right rotational module (12.1) linked with the right hinge (3*b*) of the toilet seat cover, while the right rotational module (12.1) is connected to a first inner link (8.6) through a pin (8.7);
wherein the first inner link (8.6) is slide connected to a second inner link (8.5), and the second inner link (8.5) is connected to a right rotational control ring (8.3) by a pin (8.4), while a housing ring (10*a*) and a left reciprocating module (14.2) together with a mandrel guide (16.1) are mounted on a left end of the structural pipe (1.1), while the mandrel guide (16.1) is fixed on the structural pipe (1.1), the left reciprocating module (14.2) is connected to a third inner link (16.3) through the pin (16.2), with said third inner link (16.3) being connected with a sleeve (16.5) of a spring (16.6) through a pin (16.4), while the left reciprocating module (14.2) touches the left rotational module (14.1), on the right side of which the left hinge (4*a*) of the toilet seat is mounted, while a thrust ring (10*b*) of the compression spring (9.1) pressing against the right rotational control ring (8.3) is fastened on a right end of the structural pipe (1.1), while the said compression spring (9.1) and the right rotational control ring (8.3) are seated on a disconnecting sleeve (8.1), and the right rotational control ring (8.3) features teeth (351*a*) and (351*b*), while on a left side of disconnecting sleeve (8.1) the left rotational control ring (5.4) is positioned, the left rotational control ring (5.4) has on its right surface hollow cavities (332) and (333) and a yoke (335) of a bearing ball (5.5), touching the disconnecting sleeve (8.1), whereas the left rotational control ring (5.4) is coupled with the rotational sleeve (5.2) rotary mounted on the structural pipe (1.1), while a latches control sleeve (5.3) that controls latching together with latch components (6*a*) and (6*b*) mounted on a circumference of the latches control sleeve (5.3) is seated between the left rotational control ring (5.4) and the right hinge (4*b*) of the toilet seat on the rotary sleeve (5.2), whereas on a circumference of the right hinge (4*b*) of the toilet seat the latch components (7*a*) and (7*b*) as well as openings (N) for the mounting of the latch component tips are mounted, while said latch component tips are also seated in the openings (E) of a right holder (202) of the right mounting lug (2*b*), and between a left holder (201) and the right holder (202) of the right mounting lug (2*b*), on the rotary sleeve (5.2) the rotary wheel (5.1) is seated on the cable or strand (153) passing through an opening (H) of a mounting bolt (17*b*) to a lifter control device, where the left holder (201) of the right mounting lug (2*b*) has an opening for the seating of the structural pipe (1.1), while the right holder (202) of the right mounting lug (2*b*) has an opening for the seating of the rotary sleeve (5.2), while the left holder (201) and the right holder (202) of a right mounting lug (2*b*) are mounted in a base (203) of the right mounting lug (2*b*), in which an opening (D), serving for the seating of mounting bolt (17*b*) is placed between the left holder (201) and the right holder (202), while the mounting bolt (17*b*) has an inner opening (H) going through a length of the mounting bolt (17*b*) and a head (310) of the mounting bolt (17*b*), while the toilet seat lifting control device (23) has an arm (150) mounted on a rotary wheel (151), and the rotary wheel (151) is seated in a holder (152), where the cable or strand (153) is fastened to the rotary wheel (151) of the toilet seat lifting control device (23) and to the rotary wheel (5.1) of a lifter control gear, whereas the cable or strand (153) passes through a housing (154) and a housing (19.1) on a section between the rotary wheel (151) and the rotary wheel (5.1), as well as through the opening (H) of the mounting bolt (17*b*).

2. The toilet seat lifter according to claim 1, wherein a contact surface of the left reciprocating module (14.2) with the left rotational module (14.1), as well as a contact surface of the right reciprocating module (11.1) with the right rotational module (12.1) constitute a mutually shaped contact surface.

3. The toilet seat lifter according to claim 1, wherein between a shaped contact surface of the left reciprocating module (14.2) and a shaped contact surface of the left rotational module (14.1), as well as between a shaped contact surface of the right reciprocating module (11.1) and a shaped contact surface of the right rotational module (12.1) antifriction bearings are seated.

4. The toilet seat lifter according to claim 1 wherein a shape of a contact surface of a rotational module, or a shape of a contact surface of a reciprocating module represents a sector or sectors of shaped contact surfaces.

5. The toilet seat lifter according to claim 1, wherein not less than one antifriction bearing is mounted on the mandrel (16.1).

6. The toilet seat lifter according to claim 1, wherein an arm of the left hinge (4*a*) of the toilet seat and an arm of the right hinge (3*a*) of the toilet seat cover include openings for locating the bearing balls (20*a*) and (20*b*) in them.

7. The toilet seat lifter according to claim 1, wherein the right hinge (4*b*) of the toilet seat has the mounting feather (362), points (364) and (365) of the latch components (7*a*) and (7*b*) mounting, openings (E) of the latch component tips mounting, as well as mounting openings (P).

8. The toilet seat lifter according to claim 1, wherein control switches for the toilet seat lifting control device (23) are mounted in a single enclosure with a push-button for toilet bowl flushing.

9. The toilet seat lifter according to claim 1, wherein the rotary sleeve (5.2) of the control gear, the latches control sleeve (5.3), and the left rotational control ring (5.4) constitute a single structural element.

10. The toilet seat lifter according to claim 1, wherein a thrust of the left compression spring (16.6) balances a weight of the toilet seat fastened to the hinges (4*a*) and (4*b*), whereas a thrust of the right compression spring (13.3) balances the weight of the toilet cover fastened to hinges (3*a*) and (3*b*).

11. The toilet seat lifter according to claim 1, wherein between the left holder (201) and right holder (202) of the right mounting lug (2*b*), an electric motor is seated on the structural pipe (1.1) or on the rotary sleeve (5.2), with a supply and/or control cable led through the internal opening (H) of the fastening bolt (17*b*).

* * * * *